United States Patent
Bennion et al.

(10) Patent No.: US 10,846,735 B2
(45) Date of Patent: Nov. 24, 2020

(54) ADVERTISEMENT TEMPLATES FOR IN-APPLICATION DYNAMIC ADVERTISEMENT CREATION

(71) Applicant: Vungle, Inc., San Francisco, CA (US)

(72) Inventors: Matthew Jacobsen Bennion, San Mateo, CA (US); Martin Jeffrey Price, San Francisco, CA (US); Eunbe Kim, San Mateo, CA (US); Edwin Kwok, Mountain House, CA (US); Christopher T. Brown, San Francisco, CA (US); Nicolas Goles, San Francisco, CA (US); Daniel J. Gilk, San Francisco, CA (US); Arash Afrooze, San Francisco, CA (US); Daniele Delgrosso, London (GB); Ian Stephen Harris, St. Albans (GB); Michal Pilawski, San Francisco, CA (US)

(73) Assignee: Vungle, Inc., San Francisco, CA (US)

( * ) Notice: Subject to any disclaimer, the term of this patent is extended or adjusted under 35 U.S.C. 154(b) by 287 days.

(21) Appl. No.: 15/828,264

(22) Filed: Nov. 30, 2017

(65) Prior Publication Data
US 2019/0114661 A1    Apr. 18, 2019

Related U.S. Application Data

(60) Provisional application No. 62/573,665, filed on Oct. 17, 2017.

(51) Int. Cl.
*G06Q 30/02* (2012.01)
*G06N 20/00* (2019.01)

(52) U.S. Cl.
CPC ........ *G06Q 30/0242* (2013.01); *G06N 20/00* (2019.01); *G06Q 30/0251* (2013.01);
(Continued)

(58) Field of Classification Search
CPC .......... G06Q 30/0242; G06Q 30/0251; G06Q 30/0255; G06Q 30/0261; G06Q 30/0276;
(Continued)

(56) References Cited

U.S. PATENT DOCUMENTS

| 4,069,511 A * | 1/1978 | Lelke | B41B 27/00 |
| | | | 345/545 |
| 2005/0092827 A1* | 5/2005 | Cimino | G09F 23/10 |
| | | | 235/380 |

(Continued)

FOREIGN PATENT DOCUMENTS

AL    2016161146 A1    10/2016

OTHER PUBLICATIONS

Patel, Neil, The Beginner's Guide to Gmail Ads, downloaded Sep. 2, 2020 from https://neilpatel.com/blog/the-beginners-guide-to-gmail-ads (Year: 2020).*

(Continued)

*Primary Examiner* — Scott D Gartland
(74) *Attorney, Agent, or Firm* — Athorus, PLLC

(57) ABSTRACT

Described are systems and methods for dynamically generating advertisements for presentation in an application executing on a user device, such as an application executing on a smart phone or tablet of a user. An ad server system provides various ad templates, each of which include one or more tokens at different locations within the ad templates. The same token may be included in multiple different ad templates at the same of different locations. Based on user profile and/or conditions at the time of ad presentation, an appropriate template is selected and used to dynamically generate the ad.

15 Claims, 14 Drawing Sheets

(52) U.S. Cl.
CPC ..... *G06Q 30/0255* (2013.01); *G06Q 30/0261* (2013.01); *G06Q 30/0277* (2013.01)

(58) Field of Classification Search
CPC ...... G06Q 30/0277; G06N 20/00; G06N 3/08; G06N 7/005
USPC ......... 705/14.41, 14.49, 14.53, 14.58, 14.72, 705/14.73
See application file for complete search history.

(56) References Cited

U.S. PATENT DOCUMENTS

| | | | |
|---|---|---|---|
| 2006/0031379 A1* | 2/2006 | Kasriel | H04L 67/02 709/213 |
| 2006/0095281 A1* | 5/2006 | Chickering | G06Q 30/02 705/37 |
| 2013/0311291 A1* | 11/2013 | Ward | G06Q 30/0264 705/14.58 |
| 2013/0325617 A1 | 12/2013 | Delug | |
| 2014/0297377 A1* | 10/2014 | Bhat | G06Q 30/0276 705/14.5 |
| 2016/0104207 A1 | 4/2016 | Zhao et al. | |
| 2016/0162940 A1 | 6/2016 | Kang et al. | |
| 2016/0180409 A1 | 6/2016 | Shah | |
| 2016/0292722 A1 | 10/2016 | Myers et al. | |
| 2017/0330245 A1* | 11/2017 | Guermas | G06Q 30/0275 |

OTHER PUBLICATIONS

International Search Report for International Application No. PCT/US2018/056210, dated Feb. 12, 2019.

* cited by examiner

ADVERTISEMENT TEMPLATES FOR IN-APPLICATION DYNAMIC ADVERTISEMENT CREATION

PRIORITY CLAIM

This application claims priority to U.S. Provisional Application No. 62/573,665, filed Oct. 17, 2017, entitled "Advertisement Templates For In-Application Dynamic Advertisement Creation," which is incorporated herein by reference in its entirety.

BACKGROUND

With the continued increase in mobile device usage and the availability to digital content, advertising is shifting from generic print advertising to user specific and targeted digital advertising. However, this shift has resulted in advertisers have more difficulty developing targeted advertisements for the wide variety of consumers and their preferences. Likewise, consumers have become more inundated with advertisements making it even more difficult to advertisements to stand out and be engaging to the consumers.

DETAILED DESCRIPTION

Figure 1:
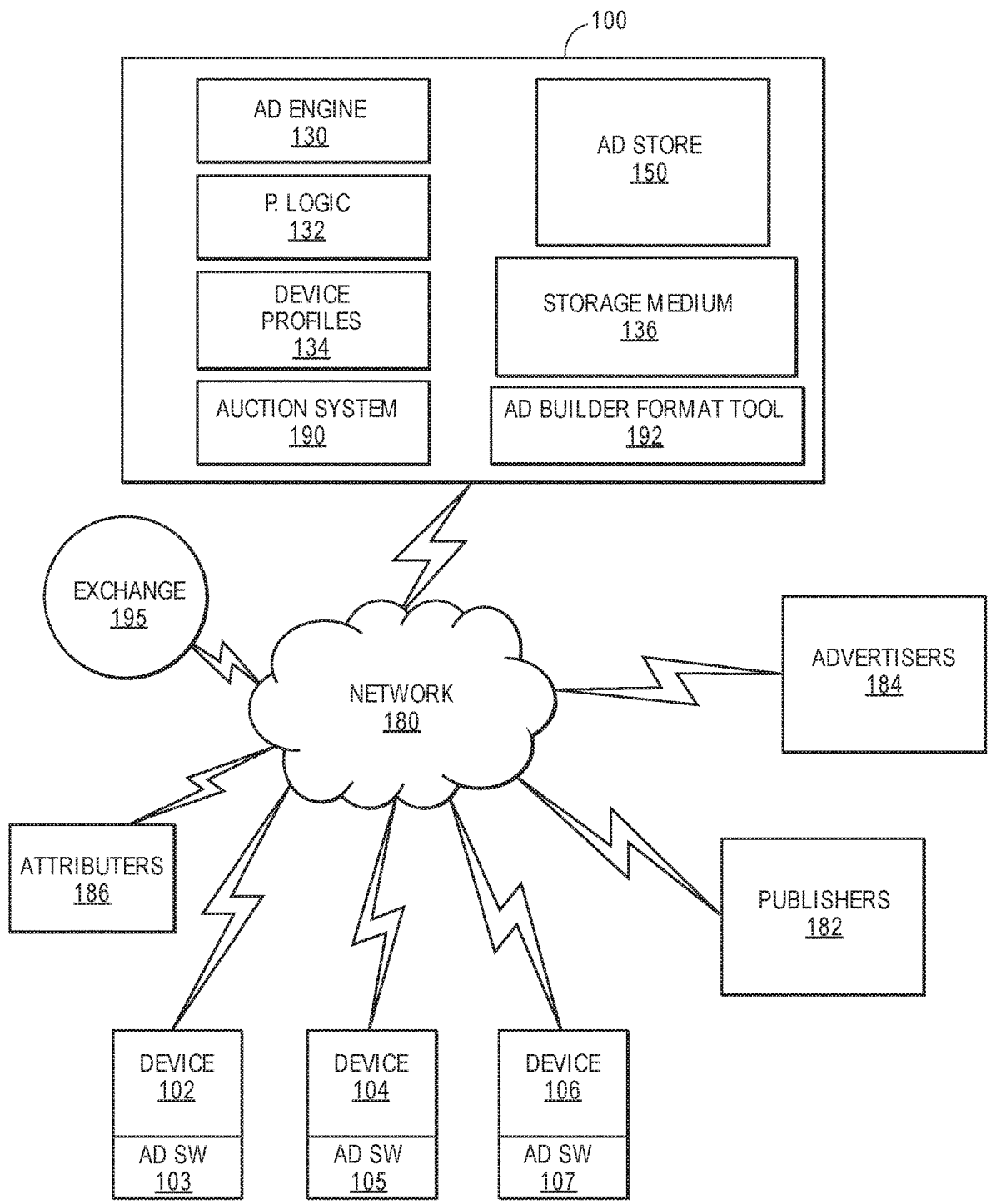
FIG. 1 is a block diagram of a system for communicating with user devices, publishers, and advertisers, in accordance with described implementations.

Methods and systems are described for dynamically generating advertisements for presentation in an application executing on a user device, such as an application executing on a smart phone or tablet of a user. The advertising server system (referred to herein as an "ad server system") provides various advertising templates ("ad templates"), each of which include one or more tokens at different locations within the ad templates. The same token may be included in multiple different ad templates at the same of different locations. Likewise, the ad templates may include the same or different tokens. Accordingly, a wide number of templates may by maintained, each with various different templates arranged at different locations within each ad template.

An advertiser, rather than trying to generate specific different advertisements for an advertising campaign, can provide to the ad server system content items (e.g., video, images, audio, haptic) associated with the advertising campaign and associate each content item with one or more tokens. When an advertisement for the advertising campaign is to be provided, a template may be used by the ad server system to dynamically generate the advertisement by selecting content items from the provided content items for each of the tokens of the ad template, based on the content item and token associations provided by the advertiser. In some implementations, various other factors may also be considered when selecting the ad template and/or content items. For example, any one or more of the following factors may be utilized in selecting an advertising template and/or content items: a user profile of a user that is executing the application in which the advertisement is to be presented, a placement within the application, a user device profile, environmental factors (e.g., time of day, day of week, location of the user device), user models that have been developed by a machine learning system, etc. Utilizing the described implementations, advertisements for an advertisement campaign may be dynamically generated for the user that will receive the advertisement, thereby increasing a probability that the user will engage with the advertisement when presented to the user in the application.

In some implementations, advertisement placement positions within an application may also be dynamically selected to further increase a probability of a user engaging with an advertisement when the advertisement is presented in the application. For example, candidate advertisement placement positions, such as all possible advertisement placement positions indicated by a producer of the application in which an advertisement may be presented, may be determined for an application. Rather than trying to fill an advertisement in each possible position, which may be disruptive to the user and unnecessary, various factors may be determined to optimize both the placement of advertisements in the application and the quantity of advertisements presented.

For example, based on a user profile and/or environment conditions, the ad server system may predict an access duration by the user during which the user will access the application on the user device. Based on the predicted access duration, and optionally other factors, a quantity of advertisements to present to the user via the application are determined. Likewise, placement of those advertisements at candidate placement positions may also be determined. In some implementations, the placement may be such that there is a high probability of presentation of the quantity of advertisements to the user during the access duration without being unnecessarily disruptive to the user.

Through the dynamic creation of advertisements for different users and the selective placement of those advertisements within an application, the probability of user engagement with the advertisements is increased. Moreover, with the described implementations, advertisers are able to produce multiple different advertisements with limited input and/or time. In addition, as those advertisements are dynamically created and presented, feedback is received regarding actual user engagement. The received information may be utilized to promote creation and presentation of some advertisements more frequently than other advertisements.

As discussed further below, in some implementations, machine learning models may be developed for user types and utilized to aid in the creation of advertisements and/or the selection of advertisement placement positions within an application. In addition, engagement feedback representative of actual user engagement may be received by the ad server system and utilized to update the models. By continually updating the models, future predictions and advertisement placements will be further enhanced.

As used herein, "advertisers" include, but are not limited to, organizations that pay for advertising services including ads on a publisher network of applications and games. "Publishers" provide content for users. Publishers include, but are not limited to, developers of software applications, mobile applications, news content, gaming applications, sports news, etc. In some instances, publishers generate revenue through selling ad space in applications so that advertisers can present advertisements in those application to user as the users interact with the application.

Advertisement performance can be defined in terms of click-through rates (CTR), conversion rates, and/or advertisement completion rates. The process in which a user selects an advertisement is referred to as a click-through, which is intended to encompass any user selection of the advertisement. The ratio of a number of click-throughs to a number of times an advertisement is displayed is referred to as the CTR of the ad. A conversion of an advertisement occurs when a user performs a transaction related to a previously viewed advertisement. For example, a conversion may occur when a user views an advertisement and installs, within a defined period of time, an application being promoted in the advertisement. As another example, a conversion may occur when a user is shown an advertisement and the user purchases an advertised item on the advertiser's web site within a defined time period. Except where otherwise noted, click-through, conversion, or other positive engagement by a user with an advertisement is generally referred to herein as an "engagement."

The ratio of the number of conversions or engagements to the number of times an advertisement is displayed is referred to as the conversion rate. A completion rate is a ratio of a number of video ads that are displayed to completion to a number of video ads initiated on a device. In some examples, advertisers may pay for their advertisements through an advertising system in which the advertisers bid on ad placement on a cost-per-click (CPC), cost-per-mille clicks (CPM), cost-per-completed-view (CPCV), cost-per-action (CPA), and/or cost-per-install (CPI) basis. A mille represents a thousand impressions.

FIG. 1 is a block diagram of an ad server system 100 for communicating with user devices 102, 104, 106, publishers 182, and advertisers 184, in accordance with described implementations. The ad server system 100 includes an advertising engine 130, processing logic 132, device profiles 134, storage medium 136, an ad store 150, an ad builder format tool 192, and an auction system 190. The auction system 190 may be integrated with the ad server system 100 or separate from the ad server system 100. The ad server system 100 provides advertising services for advertisers 184 to user devices 102, 104, and 106 (e.g., source device, client device, mobile phone, tablet device, laptop, computer, connected or hybrid television (TV), IPTV, Internet TV, Web TV, smart TV, satellite device, satellite TV, automobile, airplane, etc.). A user device profile for a device is based on one or more parameters including location (e.g., GPS coordinates, IP address, cellular triangulation, Wi-Fi information, etc.) of the device, a social profile for a user of the device, and/or categories or types of applications installed on the device. Each user device may include respective advertising services software 103, 105, 107 (e.g., a software development kit (SDK)) that includes a set of software development tools for advertising services including in-application advertising services. The publishers 182 publish content along with selling advertisement space to advertisers. Attributers 186 may install software (e.g., software development kits of publishers) on client devices and track user interactions or engagement with publisher applications and/or advertisements. The attributers 186 may then share this user data with the ad server system 100 and the appropriate publishers 182 and advertisers 184. The ad server system 100, devices 102, 104, 106, advertisers 184, publishers 182, attributers 186, and an ad exchange 195 with third party exchange participants communicate via a network 180 (e.g., Internet, wide area network, WiMAX, satellite, etc.). The third party exchange 195 participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 5 seconds prior to an ad being played on a device, less than 1 second prior to an ad being played on a device) to provide advertising services (e.g., an in-application ad that includes a preview (e.g., video trailer) of an application, in-application advertising campaigns for brand and performance advertisers) for the devices.

In one example, an ad format builder tool 192, as discussed further below, dynamically generates and provides advertisements for insertion at an ad placement position within an application for presentation to a user via a user device. The ad format builder tool allows a publisher or developer to create a new custom advertisement campaign, associate content items of the advertisement campaign with various tokens, select templates usable for dynamic creation of advertisements, etc.

The ad format builder tool 192 provides a technological improvement to advertisers allowing them to provide content items for advertisements campaign so that advertisements can be dynamically generated and tested to determine the best advertisement format for each user for each device, and/or for each application, and/or for each environment in which the advertisement is to be presented. Any changes or edits for any aspect of the ad format builder tool 192, such as new templates, association or adjustment of tokens with different locations in different templates, etc., are performed without needing to update advertising services software on a user's device.

In some implementations, the system 100 includes a storage medium 136 to store one or more software programs, content items, etc. Processing logic (e.g., 132) is configured to execute instructions of at least one software program to receive an advertising request from a user device 103, 105, 107. An ad request may be sent by a device upon the device having an ad play event for an initiated software application and/or an upon initiation of an application in which ads may be presented. The processing logic is further configured to send a configuration file and/or an advertisement to the device in response to the advertising request. The configuration file may include different options for obtaining at least one advertisement ("ad") to play on the user device during an ad play event. Alternatively, or in addition thereto, the configuration file may identify an advertisement that is stored in a memory (e.g., cache) of the user device, identify an advertisement to be obtained from the ad store 150 of the ad server system 100, identify or provide a dynamically generated ad that is to be presented, and/or indicate that an advertisement is to be obtained from the exchange 195.

Figure 2:
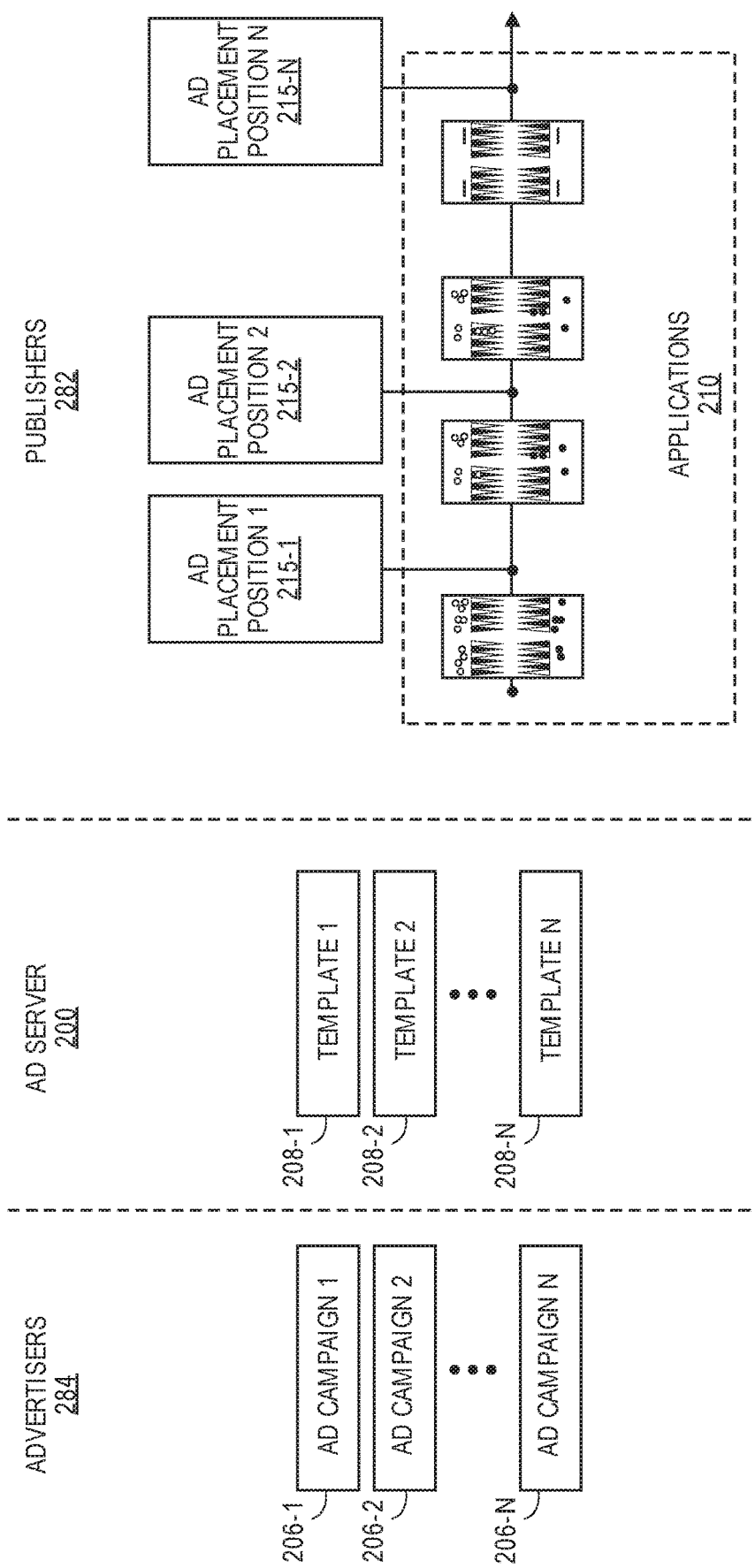
FIG. 2 is a block diagram illustrating advertising campaigns provided by advertisers, templates maintained by an ad server system, and ad placement positions within an application at which advertisements may be presented in the application, in accordance with described implementations.

FIG. 2 is a block diagram illustrating advertisement campaigns 206 provided by advertisers 284, templates 208 maintained by the ad server system 200, and ad placement positions 215 within an application at which advertisements may be presented in an application, in accordance with described implementations.

As discussed in further detail below, with the described implementations, advertisers may provide any number of ad campaigns, such as ad campaign 1 206-1, ad campaign 2 206-2 through ad campaign N 206-N, to the ad server system 200. Each ad campaign may include one or more content items, a duration of time during which the ad campaign is to be run, users or user types to which the ads of the ad campaign are to be targeted, pricing information for the ad campaign, etc. As the ad campaigns are provided by the advertisers 284 to the ad server system 200, the ad server system receives and stores the ad campaigns 206 in one or more data stores. As can be appreciated, any number of advertisers may provide any number of ad campaigns to the ad server system 200 and the ad server system will receive the ad campaigns and publish advertisements corresponding to those ad campaigns on behalf of the advertisers.

The ad server system 200 may, in turn, make available any number of templates, such as templates 208-1, 208-2 . . . 208-N, that may be selected by the advertisers for use by the ad server system in dynamically generating advertisements on behalf of the advertisers for presentation to users for which various ad campaigns 206 are targeted. In some implementations, the advertisers 284 may select the templates that are to be used in creating advertisements for an ad campaign. In other implementations, the ad server system may determine appropriate templates for use with an ad campaign. For example, as discussed further below, an advertiser may determine the types of content items provided as part on the ad campaign and/or the target user type, and the ad server system may determine templates that include tokens at locations for which the content item type may be presented and/or determine templates associated with applications that are often accessed by the target user type.

Publishers 282 may also identify applications 210 to the ad server system 200 and optionally indicate ad placement positions 215 within each application 210 into which the advertisements may be inserted and presented to users accessing the applications. In the illustrated example, a publisher 282 has indicated ad placement positions 215-1, 215-2 . . . 215-N in an application 210 in which advertisements may be inserted by the ad server system and presented to a user accessing the application when that user reaches that position in the application 210.

In some implementations, the publisher may also select one or more templates 208 that may be used to create advertisements for insertion at the different ad placement positions 215 and/or specify the types of advertisements that may be presented at the various ad placement positions 215. In other implementations, the ad server system 200 may determine which templates to use to create advertisements for insertion into the various ad placement positions 215 of an application.

In some implementations, the publisher may identify numerous ad placement positions that are available for presentation of advertisements and the ad server system may dynamically determine which ad placement positions to utilize for presentation of ads to users accessing the application. In some instances, the publisher may indicate a total or maximum number of advertisements and/or ad placement positions that may be utilized during each access duration by a user. Alternatively, or in addition thereto, the ad server system may determine the number of advertisements to present to the user and then select ad placement positions from available ad placement positions to use for presentation of advertisements to the user.

As discussed in more detail below, the ad server system 200, upon receiving ad campaigns 206 and indications of ad placement positions 215 within one or more applications 210 may dynamically generate an advertisement using content items of an ad campaign 206 and provide that advertisement to a user device for presentation at an ad placement position in an application 210 when a user accessing the application reaches the position within the application 201 at which the advertisement may be presented.

Figure 3:
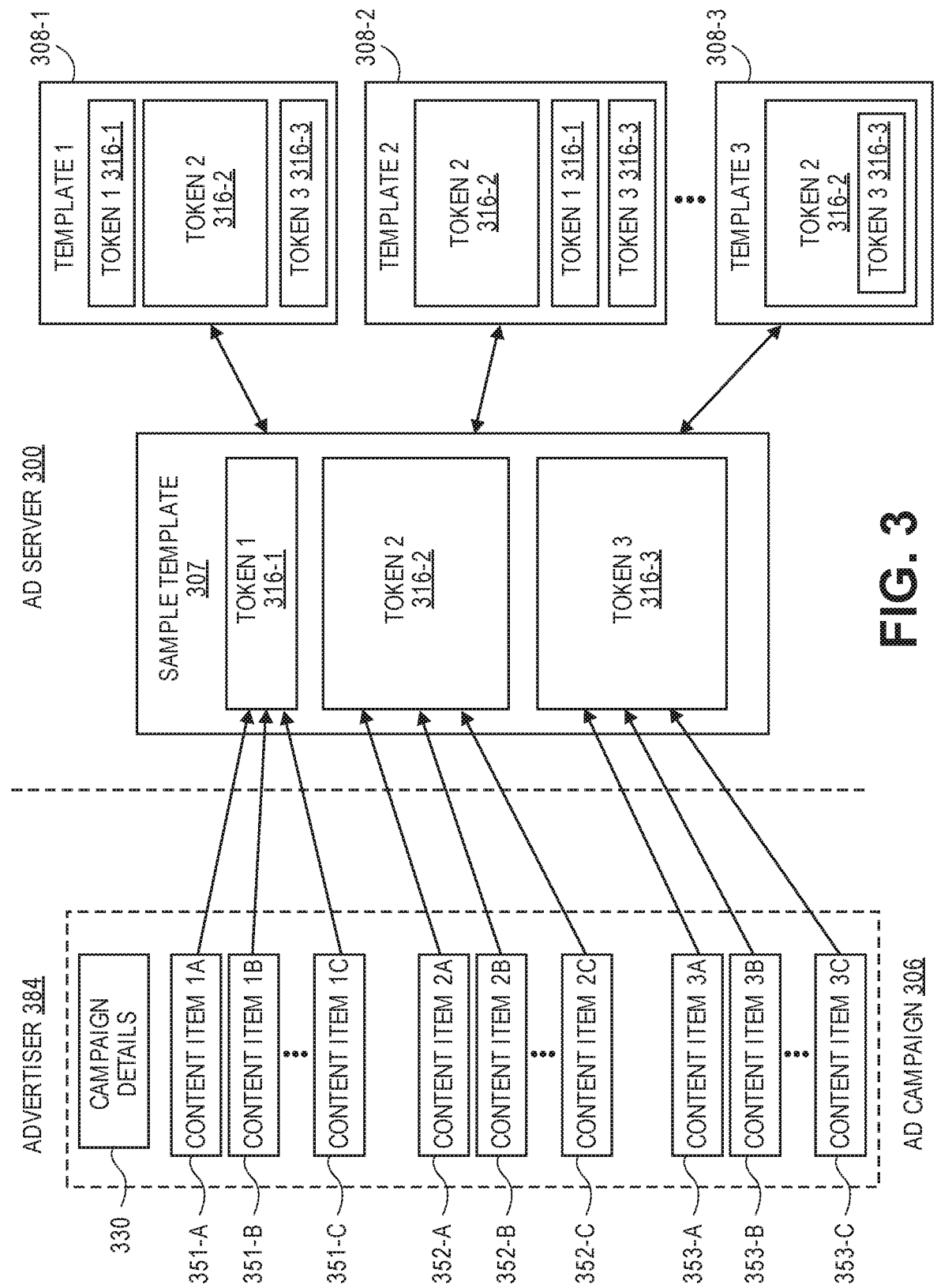
FIG. 3 is a more detailed block diagram illustrating an example ad campaign of an advertiser and templates of the ad server system, in accordance with described implementations.

FIG. 3 is a more detailed block diagram illustrating ad campaign 306 provided by an advertiser 384 and templates of the ad server system 300, in accordance with described implementations. As illustrated, an advertiser may provide an ad campaign 306 that includes campaign details 330 and one or more content items. Campaign details 330 may include, but are not limited to, start date of the campaign, end date of the campaign, target user type, desired CTR, bid pricing (e.g., CPC, CPM, CPCV, CPA, CPI, etc.), return on investment, desired action(s) in response to advertisements, desired engagement by users, etc.

In addition to the campaign details 330, the ad campaign 306 may include one or more content items. Content items may be any form or type of content item that may be reproduced by a user device and presented by the user device to a user. For example, a content item type may be video, audio, haptic, and/or any combination of two or more of video, audio, and haptic, such that the content item is presentable by a user device in any combination of visual output, audible output, and/or haptic or physical output.

In this example, the user has provided content item 1A 351-A, content item 1B 351-B, and content item 1C 351-C, all of which are of a first content item type, content item 2A 352-A, content item 2B 352-B, and content item 2C 352-C, all of which are of a second content item type, and content item 3A 353-A, content item 3B, and content item 3C 353-C, all of which are of a third content item type. As will be appreciated, any number and/or combination of content items and/or content item types may be provided with an ad campaign.

The content items 351, 352, 353 are all related to the ad campaign 306 and may be used by the ad server system 300 in various combinations to dynamically generate advertisements for the ad campaign. For example, the content items 351-A, 351-B, and 351-C may all be visual content items (e.g., images) that relate to a product that is being promoted by the advertisement campaign. Each image may vary in color, content, etc., but be related to the promoted product. In a similar manner, the other content items 352, 253 may vary in content item type and/or have other information included in the content items for presentation as part of an advertisement for the ad campaign.

In some implementations, the advertiser 384 may associate each content item, group of content items, or content items of particular content item types with one or more tokens, such as tokens 316-1, 316-2, and 316-3. A token may be any form of indicator or designation that may be associated with one or more content items provided by an advertiser as part of an ad campaign. Likewise, tokens may be associated with various positions within different ad templates 308 maintained by the ad server system. In the illustrated example, the advertiser is presented with a sample template 307 that includes three tokens 316-1, 316-2, and 316-3, each of the three tokens associated with a different location in the sample template 307. The advertiser may select which content items 351-A, 351-B, 351-C, 352-A, 352-B, 352-C, 353-A, 353-B, and 353-C to associate with which tokens 316-1, 316-2, and 316-3 of the sample template 307. In this example, the advertiser has associated content items 351-A, 351-B, and 351-C with token 1 316-1, associated content items 352-A, 352-B, and 352-C with token 2 316-2, and associated content items 353-A, 353-B, and 353-C with token 3 316-3.

In some implementations, the advertiser may simply designate content item types and the ad server system may associate the different content item types with corresponding tokens for those types of content items. For example, token 2 316-2 may be designated for a main video content item that is to be included in a generated advertisement. In such an example, the advertiser may identify main video content items, such as content item 352-A, 352-B, and 352-C, and the ad server system 300 will automatically associate those content items with token 2 316-2.

The ad server system 300 also maintains a plurality of templates that may be used by the ad server system 300 to dynamically generate ads using content items provided by the advertisers. As illustrated, the templates 308 may have different layouts to present different types and/or structures of advertisements. Each template may have a different layout, and different tokens may be associated with different locations within each template. For example, template 1 308-1 includes three tokens. Token 1 316-1 is positioned at an upper location of the template 308-1, token 2 316-2 is positioned at a middle location of template 1 308-1, and token 3 316-3 is at a lower location of template 1 308-1. In comparison, in template 2 308-2 token 2 316-2 is at the upper location of template 2 308-2, token 1 316-1 is at the middle location, and token 3 316-3 at a lower location of template 2 308-2. Template 3 308-3 includes two tokens, token 2 316-2 and token 3 316-3, with token 2 316-2 filling the majority of template 3 308-3 and token 3 positioned within a perimeter of token 2 316-2.

As advertisement requests are received from user devices, the ad server system dynamically generates an advertisement by selecting an appropriate template 308 and generating an advertisement corresponding to that template layout using content items provided by an advertiser and associated with tokens identified in the selected template. For example, if the ad server system 300 selects template 1 308-1 to generate an advertisement, the ad server system may select any one of content items 351-A, 351-B or 351-C, which are associated with token 1 316-1, to populate the upper location of the template associated with token 1 316-1. Likewise, the ad server system may select any one of content items 352-A, 352-B, or 352-C, which are associated with token 2 316-2, to populate the middle location of the template associated with token 2 316-2. Finally, the ad server system 300 may select any one of content items 353-A, 353-B, or 353-C, which are associated with token 3 316-3, to populate the bottom location of the template associated with token 3 316-3.

As discussed further below, selection of the template and/or the content items may be based on a variety of factors, including, but not limited to, the requesting user device, the application in which the advertisement is to be presented, a user to which the advertisement will be presented, a location of the user device, a time of day, a day of the week, a predicted access time that the user will access the application during the current access session, a machine learned model determined to be representative of the user, etc. In some implementations, the same content item may be presented at different locations through different templates because, for example, the same token associated with that content item may be positioned at different locations in those templates.

Upon selection of the respective content items, the ad server system generates an advertisement and sends the advertisement back to the requesting user device for presentation in the placement position for the advertisement.

Figure 4A:
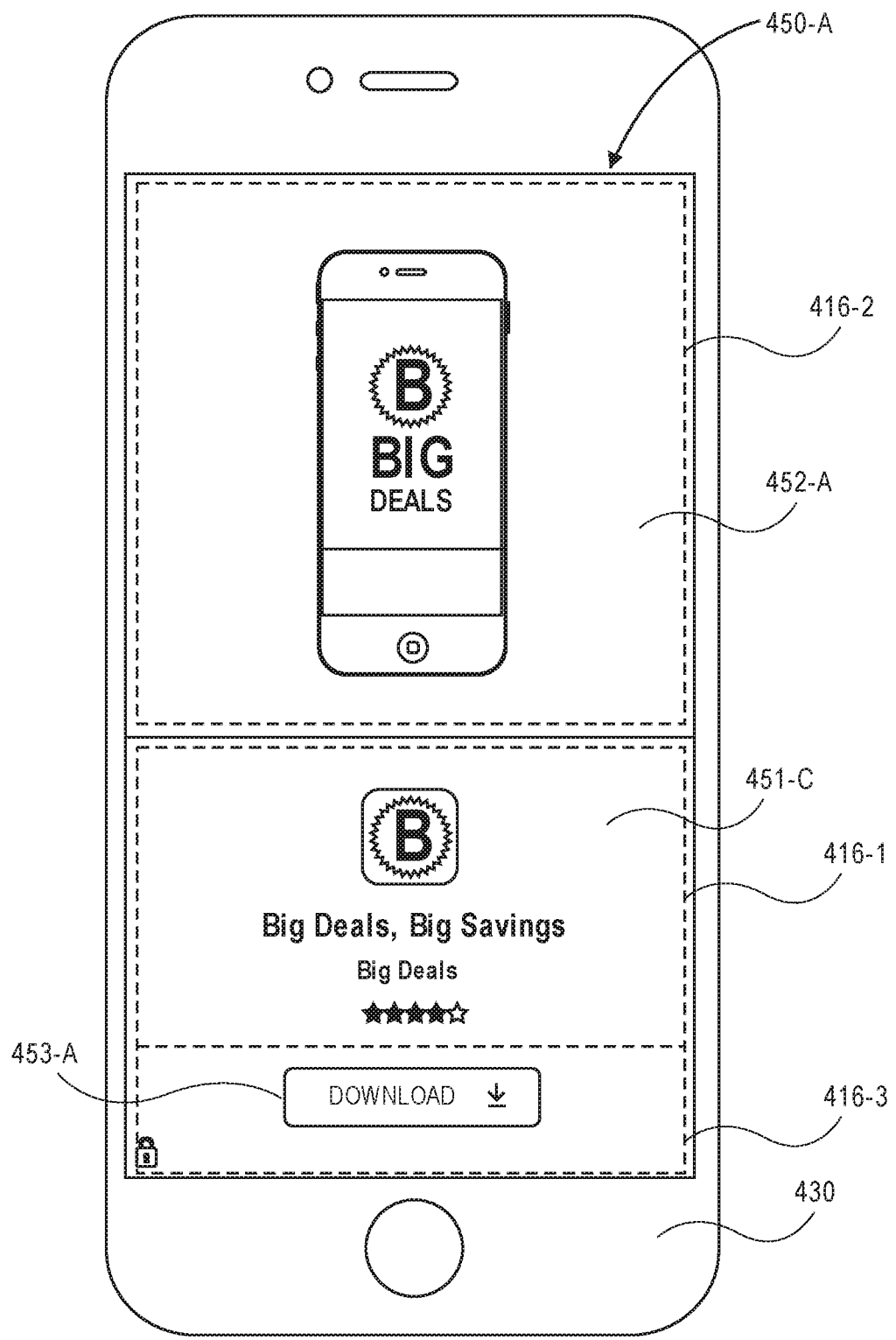
FIGS. 4A-4C illustrate different example advertisements generated using content items from an ad campaign using different templates, in accordance with described implementations.
Figure 4B:
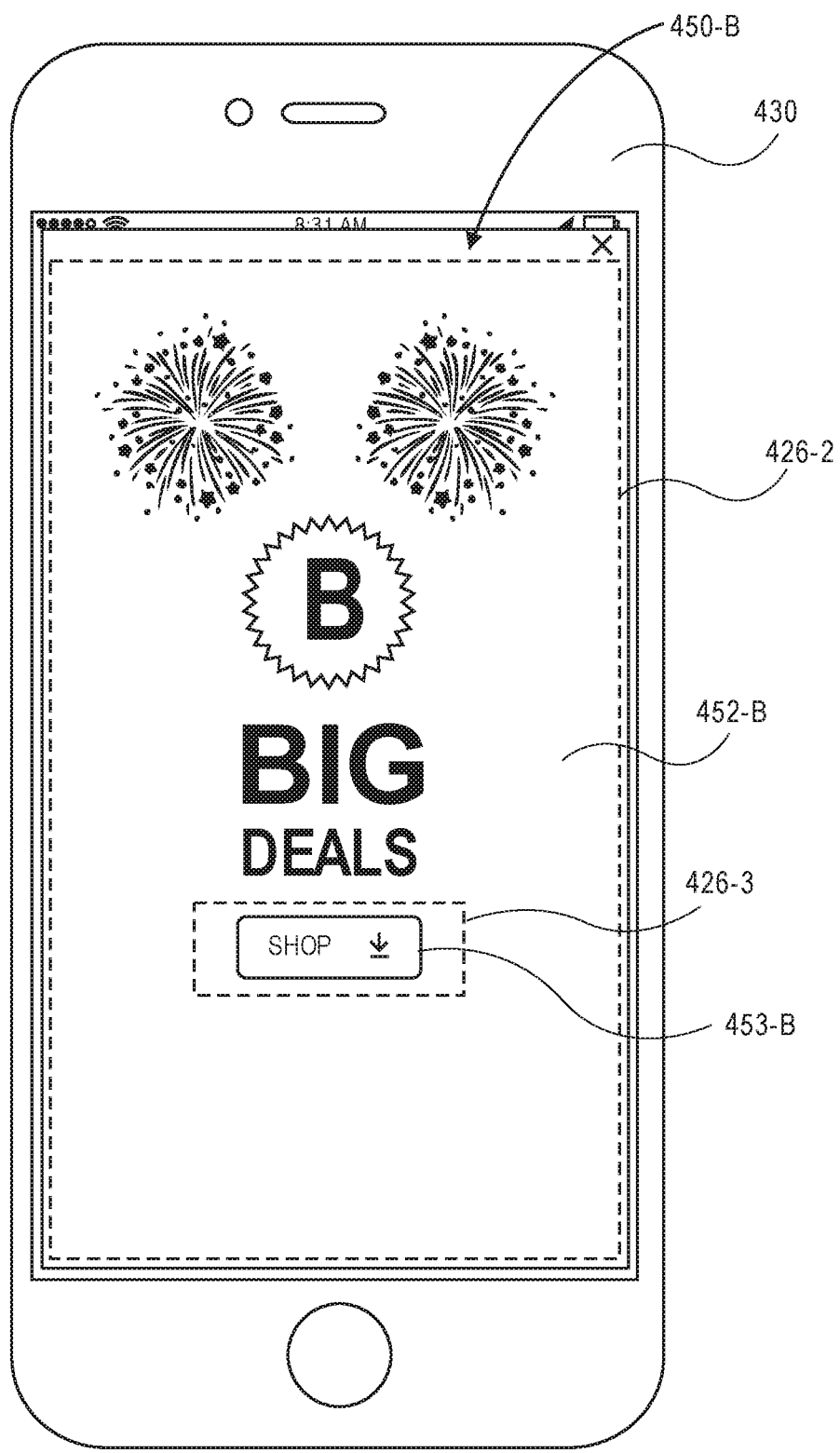
Figure 4C:
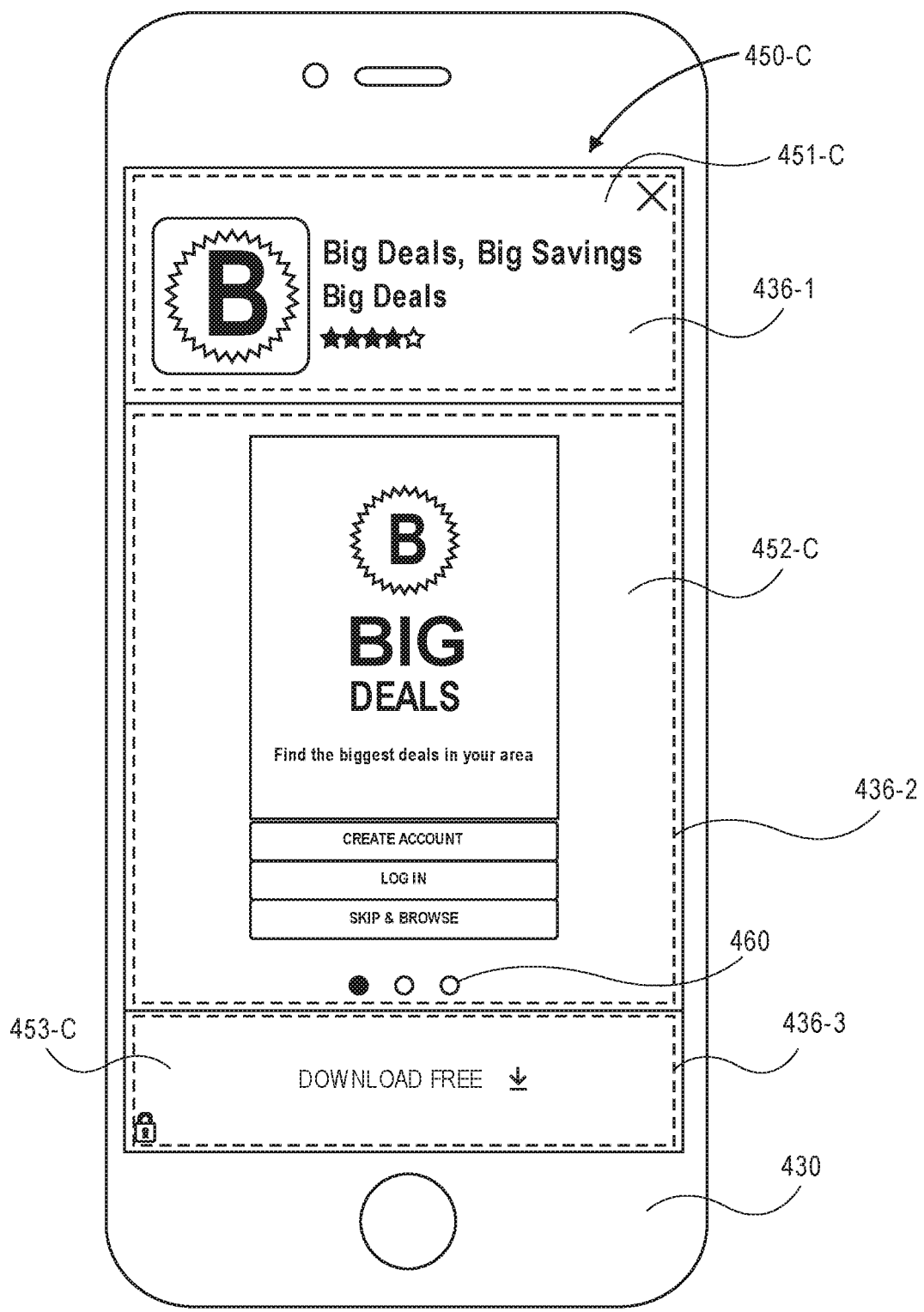

FIGS. 4A-4C illustrate different example advertisements generated using content items from an ad campaign using different templates, in accordance with described implementations. Referring first to FIG. 4A, illustrated is an example advertisement 450-A presented on a user device 430 at a placement position within an application. Referring back to FIG. 3, advertisement template 2 308-2 was utilized to generate the advertisement 450-A that is presented on the user device 430. As illustrated in FIG. 3, template 2 308-2 positions token 2 316-2, at an upper position, illustrated by the dashed lines 416-2 (FIG. 4A) and the ad server system has selected content item 452-A that is associated with token 2 316-2 to populate the upper position 416-2. In this example, the content item 452-A is a video content item. As the advertisement is presented on the user device 430, the video is played as part of the presentation to the user viewing the advertisement.

Template 2 308-2 positions token 1 316-1 at a middle position within the template, illustrated by dashed lines 416-1 (FIG. 4A) and the ad server system has selected content item 451-C that is associated with token 1 316-1 to populate the middle position 416-1. In this example, content item 451-C is a still image content item. Finally, template 2 308-2 positions token 3 316-3, at a lower position, illustrated by the dashed lines 416-3 (FIG. 4A) and the ad server system has selected content item 453-A that is associated with token 3 316-3 to populate the lower position 416-3. In this example, content item 453-A is an interactive control that is selectable by the user to perform one or more actions, such as download a digital item (e.g., application) corresponding to the advertisement.

In some implementations, one or more of the content items may be interactive. For example, the user may select the content item 452-A to cause the video to be presented on the full display of the user device 430, to stop, start, reverse, fast forward, etc. As another example, the content item 451-C may be selectable by the user to cause the user device to navigate to another location, such as a Uniform Resource Locator (URL), an application store, etc., and present additional information to the user about the item being advertised.

FIG. 4B illustrates another example advertisement 450-B presented on a user device 430 at a placement position within an application. Referring back to FIG. 3, advertisement template 3 308-3 was utilized to generate the advertisement 450-B that is presented on the user device 430. As illustrated in FIG. 3, template 3 308-3 positions token 2 316-2 within the main portion of the display of the user device 430, illustrated by the dashed lines 426-2 (FIG. 4B) and the ad server system has selected content item 452-B that is associated with token 2 316-2 to populate position 426-2. In this example, the content item 452-B is an animation content item about the item being advertised. As the advertisement is presented on the user device 430, the content item is animated, in this example through the illustration of exploding fireworks.

Template 3 308-3 positions token 3 316-3 at a position 426-3 that within the first position 426-2 such that the selected content item 453-B appears within the content item 452-B presented in the main position 426-2. In this example, content item 453-B that is associated with token 3 316-3 is selected to populate the position 426-3. In this example, content item 453-B is an interactive control that is selectable by the user to perform one or more actions, such as to initiate a shopping session corresponding to the advertisement.

FIG. 4C illustrates an example advertisement 450-C presented on a user device 430 at a placement position within an application. Referring back to FIG. 3, advertisement template 308-1 was utilized to generate the advertisement 450-C that is presented on the user device 430. As illustrated in FIG. 3, template 1 308-1 positions token 1 316-1, at an upper position, illustrated by the dashed lines 436-1 (FIG. 4C) and the ad server system has selected content item 451-C that is associated with token 1 316-1 to populate the upper position 436-1. In this example, the content item 451-C is a still image content item.

Template 1 308-1 positions token 2 316-2 at a middle position within the template, illustrated by dashed lines 436-2 (FIG. 4C) and the ad server system has selected for initial presentation content item 452-C that is associated with token 2 316-2 to populate the middle position 416-2. In this example, multiple content items are selected and associated with middle position 436-2, each of which may be presented sequentially or upon selection by a user viewing the content item. For example, indicator 460 illustrates that, in this example, there are three content items associated with token 2 that were selected and included in the advertisement 450-C. A user may interact with the middle position 436-2, e.g., by swiping left or right to view different content items within the middle position 436-2 of the advertisement.

Finally, template 1 308-1 positions token 3 316-3, at a lower position, illustrated by the dashed lines 436-3 (FIG. 4C) and the ad server system has selected content item 453-C that is associated with token 3 316-3 to populate the lower position 436-3. In this example, content item 453-C is an interactive control that is selectable by the user to perform one or more actions, such as download a digital item (e.g., application) corresponding to the advertisement.

As illustrated above, the described implementations are operable to dynamically generate a variety of advertisements for an ad campaign for presentation to a user that is accessing an application on a user device. While the above examples illustrate advertisement that include video content items, digital still content items, animation content items, and interactive content items, it will be appreciated that any form of content item may be included in various advertisements and/or portions of advertisements. For example, a sample content item may be presented in a portion of an advertisement that includes an interactive sample of an item (e.g., application) that is being advertised that a user can actually interact with and experience. Likewise, while the example advertisements presented in FIGS. 4A-4C are illustrated as being presented on the entire display of the user device 430, in other implementations, templates may be utilized to dynamically generate advertisements that are less than the full display screen. For example, one or more templates may be utilized to generate advertisements that are only presented in a lower or upper portion of the display of the user device such that the application being accessed is presented in the other portion of the display and remains visible and accessible to the user.

With the examples presented herein, the ad server system provides a technological improvement over existing systems by allowing the generation of advertisements for an ad campaign without the need for an advertiser, the ad server system, and/or another entity manually create each of those advertisements. In addition, as discussed further below, any number of factors may be considered at the time of advertisement creation to generate an advertisement that is specific to the content being advertised, the user device receiving the advertisement, the user that is to view the advertisement, and/or the conditions or environment within which the user is going to view the advertisement, thereby increasing the potential for user engagement with the advertisement. Still further, feedback from a presented advertisement may be received to further enhance the prediction and creation of advertisements in the future for that user and/or other users.

In addition, because content items are associated with tokens and tokens are associated with positions with various templates that are used to generate the advertisements, content items for an ad campaign may be added and/or removed from the ad campaign and associated with the tokens, without having to recreate the advertisements for the ad campaign. For example, an advertiser may add additional video content items to an ad campaign, associate those video content items with one or more tokens, and those additional video content items will be incorporated into dynamically generated advertisements created by the ad server system for that ad campaign. Likewise, additional templates may also be created using existing tokens to further increase the variability or number of advertisements that may be generating using content items associated with those templates. Finally, through the use of content items, tokens, and templates, modifications to advertisements, as discussed herein, may all be done by the advertiser and/or the ad server system and may not require any modifications and/or updates to the SDK that is included in or used with the applications provided by publishers.

Figure 5:
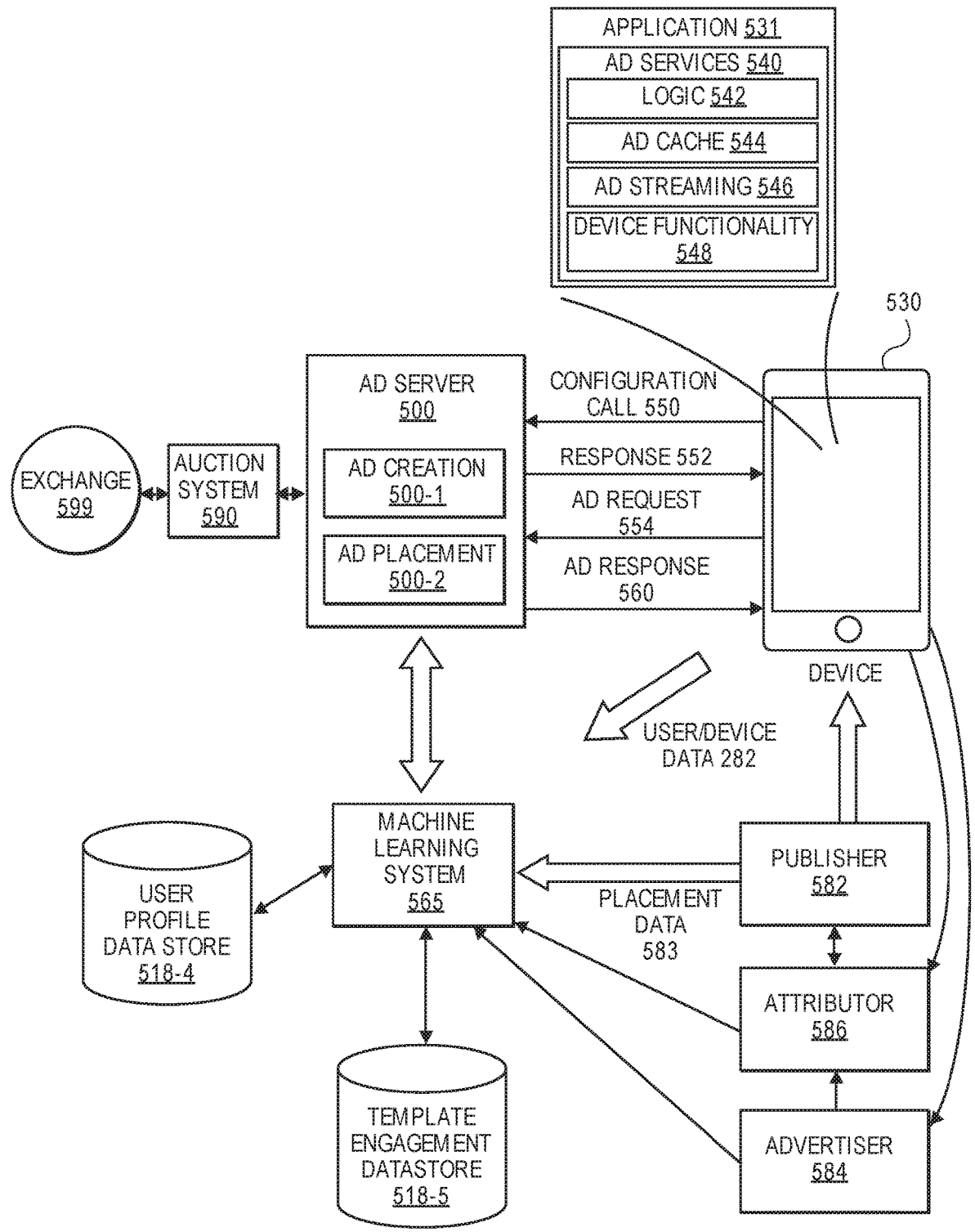
FIG. 5 is a block diagram illustrating the exchange of information between an ad server system, a user device, publishers, an advertiser, and an attributor, in accordance with described implementations.

FIG. 5 is a block diagram illustrating the exchange of information between an ad server system 500, a user device 530, publishers 582, an advertiser 584, and an attributor 586, in accordance with described implementations. In this example, a user device 530 (e.g., source device, client device, mobile phone, tablet device, laptop, computer, connected or hybrid television (TV), IPTV, Internet TV, Web TV, smart TV, etc.) initiates a software application (e.g., a mobile application, a mobile web browser application, a web based application, non-web browser application, etc.). For example, a user may select one of several software applications 531 installed on the user device. The advertising services software 540, operating on the user device 530, is also initiated upon the initiation of one of the software applications 531. The advertising services software 540 may be associated with or embedded with the software application. The advertising services software 540 may include or be associated with logic 542 (e.g., communication logic for communications such as an ad request), an ad cache store 544 for storing one or more of the dynamically generated ads provided by the ad server system 500 to the user device 530, ad streaming functionality 546 for receiving, optionally storing, and playing ads streamed from the ad server system 500, and device functionality 548 for determining device and connection capabilities (e.g., type of connection (e.g., 4G LTE, 3G, Wi-Fi, WiMAX, etc.), bandwidth of connection, location of device, type of device, display characteristics (e.g., pixel density, color depth), etc.). The initiated software application(s) or advertising services software 540 may have an ad play event for displaying or playing an ad on the display of the device 530. At operation, the ad services 540 generates and sends to the ad server system 500 a configuration call request 550. The configuration call may include information about the user accessing the software application, user device information, location, and/or other information collected by the logic 542. The ad server system, in response to receiving a configuration call 550, determines options for ad play events corresponding to the software application being accessed on the user device 530 and optionally determines which of a plurality of candidate ad placement positions within the software application are to be utilized to present advertisements to the user. Selection of which candidate ad placement positions are to be utilized is discussed further below with respect to FIG. 10.

The options may include, but are not limited to, options for obtaining an advertisement to present on the user device in response to an ad play event, ad placement positions that are to be utilized within the software application to present advertisements to the user, etc. In one implementation, a first option may include playing at least one ad that is cached in the ad cache memory 544 of the user device 530 during the ad play event. A second option may include planning to play at least one ad that is cached in the memory 544 on the device 530 but asking for at least one additional ad from the ad server system 500. If the ad server system generates and sends another ad in a timely manner (e.g., in time for a predicted ad play event at a selected ad placement position, within a time period set by the at least one configuration file) then the provided ad will be presented during the predicted ad play event at the ad placement position within the software application 531. Another option may include streaming at least one ad to be played during the predicted ad play event to the device 530. The configuration file can be altered by the ad server system 500 or the user device 530 without affected the advertising services software 540.

As a user is accessing the software application 531, an ad placement position at a future location within the software application that has been indicated as an ad placement position to be utilized is determined and the ad services 540 sends an ad request 554 to the ad server system 500 requesting an advertisement to present at that ad placement position. The ad server system 500, upon receiving the ad request 554, utilizes the information from the configuration file and optionally any additional information included in the ad request 554, information from the attributer 586, and/or information from the advertiser 584 to dynamically generate and send an advertisement to the user device 530 for presentation at the ad placement position in response to the ad play event. Dynamic generation of an ad is discussed above and further below with respect to FIG. 9.

The ad request 554 may include different types of information, including, but not limited to, publisher settings (e.g., a publisher of the selected software application), an application identifier identifying the software application 531, ad placement position information for timing placement of an ad in-app, user profile information, user device characteristics (e.g., device id, OS type, network connection for user device, whether user device is mobile device, volume, screen size and orientation, language setting, etc.), environmental information (e.g., geographical data, location data, motion data, such as from an accelerometer or gyroscope of the user device), language, time, application settings, demographic data for the user of the device, access duration data (e.g., how long a user has been using the selected application), and cache information. The ad server system 500 processes the ad request 554, and optionally other information, as discussed further below, to dynamically generate an advertisement that is sent to the user device as the ad response 560 for presentation at the ad placement position.

Attributers 586 may have software (e.g., a SDK of the publisher of the application) installed on the user's device and obtain third party user data from the user device. This user data may include, but is not limited to, a user's interaction and engagement with the software application, a length of time that the application is installed, an amount of purchases from the application, buying patterns in terms of which products or services are purchased and when these products or services are purchased, engagement with advertisements presented in applications, access duration by a user of an application, etc. As the attributor collects data from the user device, the collected data may be provided to a machine learning system 565, which may be included in the ad server system or separate from the ad server system. In some implementations, data may also or alternatively be provided directly from the user device to the machine learning system 565.

In some implementations, advertisers and/or the ad server system may also provide data to the machine learning system 565. For example, the ad server system 500 may provide information indicating the ad template, content items, and/or ad placement positions used for generating and presenting ads to a particular user in a particular application, etc. Likewise, in some implementations, publishers 582 may also provide information to the machine learning system, including, but not limited to, application information (e.g., type and/or content of the application), candidate ad placement positions, etc.

The machine learning system 565, as discussed further below, upon receiving information from the ad server system 500, device 530, publisher 582, attributors 586, and/or advertisers 584, may generate user models representative of groups of users that receive in-application advertisements from the ad server system 500. The user models may be generated based on actual user interaction and/or engagement with presented advertisements and indicate engagement predictions for advertisements based on a combination of one or more of the device profile, application, ad placement position, user profile, and/or environment conditions. Machine learning and the generation of user models is discussed further below with respect to FIGS. 6-8.

Figure 6:
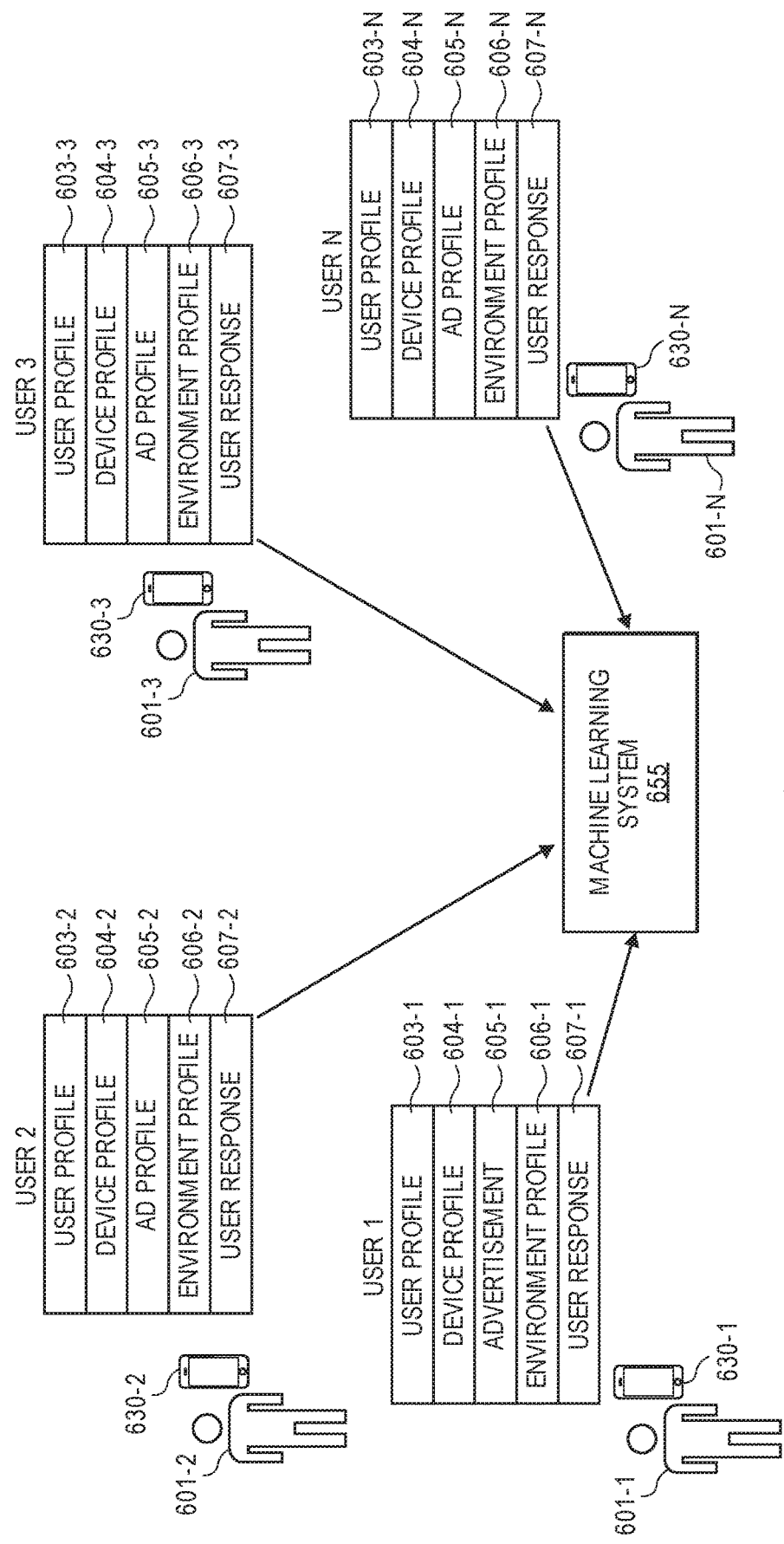
FIG. 6 is a block diagram of a machine learning system that receives user profiles, device profiles, advertisement profiles, environment profiles, and user engagement response, according to described implementations.

FIG. 6 illustrates a plurality of users 601(1), 601(2), 601(3),-601(N) that interact with applications presented on a respective user device 630(1), 630(2), 630(3),-630(N) and have corresponding user profiles 603-1, 603-2, 603-3,-603-N. As the users 601 interact with applications and/or as the ad server system discussed herein sends advertisements that are presented in-application to the users, or otherwise, the actual user response 607 or user engagement is monitored and included as part of the user profile 603 of the user. In addition, other data, generally referred to herein as conditions, may also be included in the user profile as actual conditions at the time each advertisement is presented to the user. For example, the device profile 604 (e.g., device type, orientation, connectivity, etc.), advertisement 605, or advertisement identifier, and/or the environment profile (e.g., device/user location, time of day, day of week, temperature) may be maintained in each user profile as representative of the conditions during the presentation of the advertisement by the user device to the user.

For example, when user 1 601-1 is accessing an application and is presented with an advertisement, the user profile 603-1 for user 1 601-1 may be updated to include an advertisement identifier 605-1 representative of the presented advertisement, device profile 604-1 corresponding to the device at the time of the advertisement presentation, and environment profile 606-1 corresponding to environmental conditions at the time of the advertisement presentation. In addition, an actual user response 607-1 or engagement value may likewise be determined and stored as part of the user profile 603-1 for user 1.

In a similar manner, when user 2 601-2 is accessing an application and is presented with an advertisement, the user profile 603-2 for user 2 601-2 may be updated to include an advertisement identifier 605-2 representative of the presented advertisement, device profile 604-2 corresponding to the device at the time of the advertisement presentation, and environment profile 606-2 corresponding to environmental conditions at the time of the advertisement presentation. In addition, an actual user response 607-2 or engagement value may likewise be determined and stored as part of the user profile 603-2 for user 2. When user 3 601-3 is accessing an application, and is presented with an advertisement, the user profile 603-3 for user 3 601-3 may be updated to include an advertisement identifier 605-3 representative of the presented advertisement, device profile 604-3 corresponding to the device at the time of the advertisement presentation, and environment profile 606-3 corresponding to environmental conditions at the time of the advertisement presentation. In addition, an actual user response 607-3 or user engagement by user 3 601-3 with the presented advertisement may likewise be determined and stored as part of the user profile 603-3 for user 3. when user N 601-N is accessing an application, and is presented with an advertisement, the user profile 603-N for user N 601-N may be updated to include an advertisement identifier 605-N representative of the presented advertisement, device profile 604-N corresponding to the device at the time of the advertisement presentation, and environment profile 606-N corresponding to environmental conditions at the time of the advertisement presentation. In addition, an actual user response 607-N or engagement value may likewise be determined and stored as part of the user profile 603-N for user N.

As the user profiles are updated with actual information corresponding to a presented advertisement, the actual data, represented by each user profile is provided to a machine learning system 655 as training inputs.

Because users vary in their preferences, interests, application use patterns, behaviors, etc., and those things further vary based on other conditions (e.g., time of day, day of week, time of year, location, weather, etc.), actual user behavior exhibited by users in response to advertisements presented within different applications and/or at different advertisement placement positions within application will likewise vary. As a particular example, if an advertisement, such as the advertisement presented in FIG. 4A is presented to three different users at the same advertisement placement position within the same application and under similar conditions, the user response from each user may vary. The following Table 1 illustrates example excerpts of respective user profiles, and portions of the actual user behavior for users 601(1), 601(2), and 601(3) of FIG. 6 following a presentation of an advertisement under similar conditions. As will be appreciated, the user profiles may include fewer or additional items of information beyond that presented in this table 1.

TABLE 1

| USER PROFILE | USER1 | USER 2 | USER 3 |
|---|---|---|---|
| AGE | 23 | 19 | 45 |
| GENDER | MALE | FEMALE | FEMALE |
| DEVICE PROFILE | | | |
| DEVICE TYPE | PHONE A | PHONE A | PHONE A |
| AD PROFILE | | | |
| AD IDENTIFIER | 1234 | 1234 | 1234 |
| ACCESS DURATION | 18 MIN. | 22 MIN. | 15 MIN. |
| AD PLACEMENT POSITION | PLACEMENT 1 | PLACEMENT 1 | PLACEMENT 1 |
| CONDITIONS | | | |
| LOCATION | 48.282; −122.231 | 33.653; −96.636 | 39.482; −106.038 |
| WEATHER | CLEAR | CLEAR | CLEAR |
| TEMPERATURE | 18 | 23 | 17 |
| DATE | Aug. 4, 2017 | Aug. 4, 2017 | Aug. 4, 2017 |
| TIME | 12:30:00 | 14:25:34 | 22:22:22 |
| USER RESPONSE | | | |
| ENGAGEMENT | CLICK-THROUGH | NONE | APP. CLOSE |

As illustrated, user response may vary based on any one or more of a variety of factors present at the time of presentation of the advertisement to different users. These different responses may be due to different interests, preferences, desires, conditions, etc., of the different users.

In accordance with the present disclosure, the user profile information, such as that illustrated in Table 1 may be provided as inputs to a machine learning system 655, either in real time or in near-real time, as the data is collected in response to presented advertisements. Returning to FIG. 6, the details of each user profile 603 of each of the users 601(1), 601(2), 601(3),-601(N) at the time an advertisement is presented may be provided to the machine learning system 655, as a set of training inputs, and the actual user response 607 or engagement value that is exhibited by each of the users 601 in response to the advertisements under those conditions is provided to the machine learning system 655 as a set of training outputs corresponding to each user profile 603.

The machine learning system 655 may be fully trained using a substantial corpus of user profiles, advertisements, and actual user responses (engagement values) to those advertisements to develop user models for different user profiles and to correlate user profiles with the developed user models. For example, some users may have similar user profiles and produce similar responses to an advertisement presented under similar conditions. Such types of users may be correlated and associated with a user model by the machine learning system 655 and utilized as representative of users having user profiles that are similar. After the machine learning system 655 has been trained, and the user models developed, the machine learning system may be provided with a user profile, current conditions, application information, ad placement position information, and a device profile, and the machine learning system will generate engagement predictions for different combinations of templates and content items for the ad campaign. The ad server system may then select a template and combination of content items that has the highest probability of engagement from that user under those conditions. In some implementations, user models may also be developed to allow selection of one or more ad placement positions in which the generated advertisement is to be presented within the application.

Training of the machine learning system may include thousands or millions of user profiles, conditions, advertisements, etc., and actual user engagement values in response to presented advertisements from different advertisement campaigns.

Figure 7:
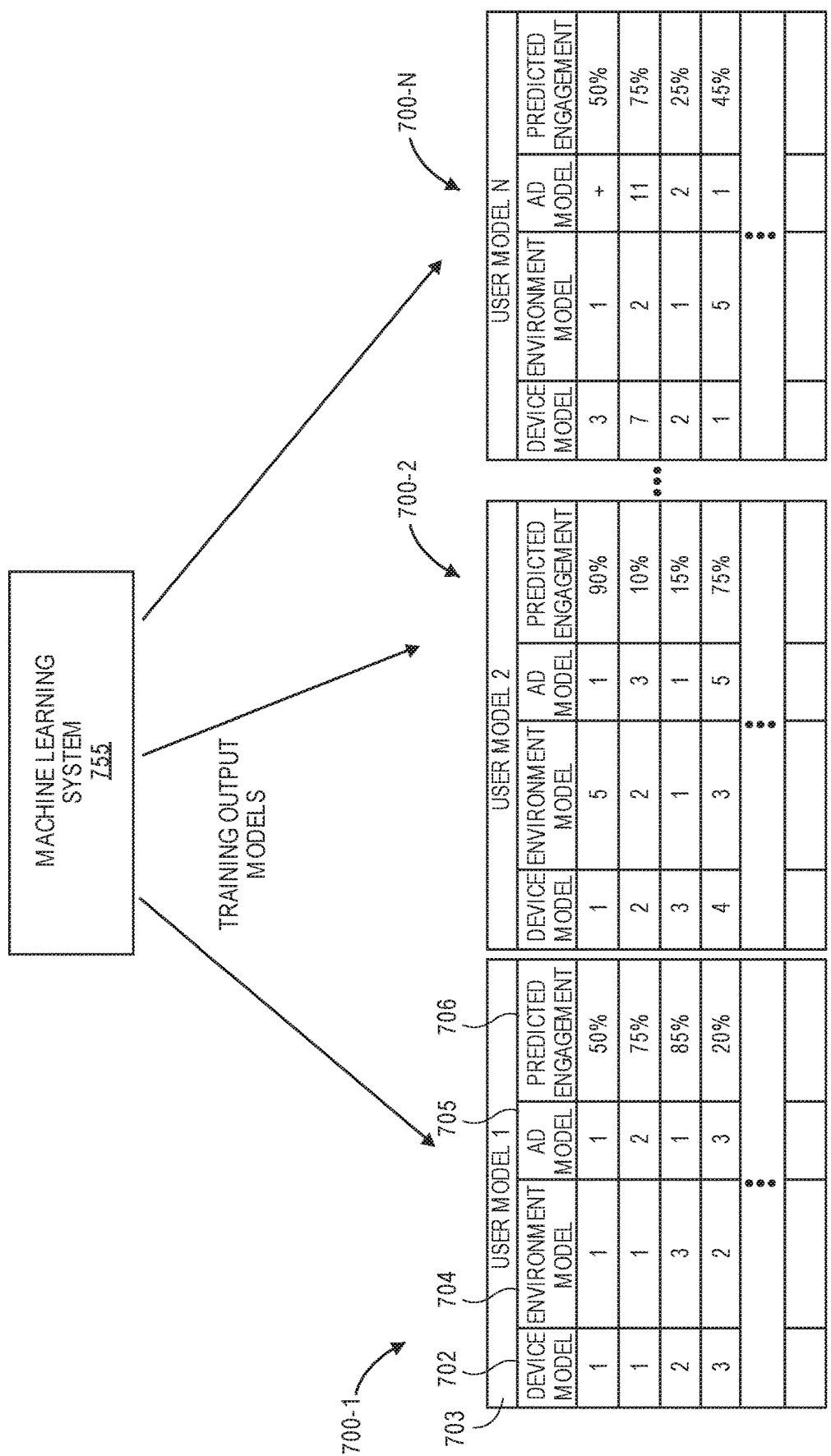
FIG. 7 is a block diagram of the machine learning system of FIG. 6, producing output user models based on the training inputs, in accordance with described implementations.

Referring to FIG. 7 illustrated are example user models 700 that may be output by the machine learning system 755 in response to receiving training inputs. For example, the training inputs, as discussed above with respect to FIG. 6, may include multiple different user profiles and multiple different advertisements from an ad campaign performed with respect to those different user profiles. In some implementations, the machine learning system may develop user models for different groups of users for each different advertising campaigns, and/or for varying conditions.

The user models 706 produced by the machine learning system may classify the user profiles into different user models, such as user model 1 700-1, user model 2 700-2, user model N 700-N. Each user model may be representative of a group of user profiles having similar attributes and producing similar engagement responses to an advertisement under similar conditions. In some implementations, a user model may be representative of hundreds, thousands, or millions of similar user profiles and/or conditions. Likewise, in some implementations, a user profile may correspond to one and only one user model. In other implementations, a user profile may correspond to different user models, for example depending on the recommendation campaign to be produced and/or the conditions.

Included in each user model is an indication of the user profile characteristics (e.g., demographics, location, age range, device types, etc.) corresponding to the user model and representative of the user profiles utilized to develop the user model 700. For example, user model 700-1 includes user profile characteristics 703. Likewise, each user model may include a device model 702, environment model 704, advertising model 705, etc. The device models may represent different types of devices, such as cell phone, tablet, laptop, desktop, etc., on which the applications are accessed and the corresponding advertisements are presented. Alternatively, the device models 702 may represent the different brands of devices, such as Brand A, Brand B, Brand C, etc.

The environment model may represent similar environmental conditions at the time the advertisement was presented on the user device. For example, one environment model may be established for environmental conditions such as a time range (e.g., 08:00-10:30), a day of the week (e.g., Monday), a time of year (e.g., summer), weather conditions (e.g., clear with a temperature between 18-23 Celsius), device location, and/or any other conditions. The advertising model 705 may represent advertisements for an ad campaign based on the template and content items utilized with the template, as discussed above. For example, there may be a different advertisement model for each template and combination of content items for an ad campaign.

The user models also include predicted engagement values 706 for each combination of user model 703, device model 702, environment model 704, and advertising model. The predicted engagement indicates the probability of a user engagement (e.g., click-through, purchase, interaction, etc.) in response to an ad model presented to a user having a user profile similar to that modeled with the other conditions being present.

Those of ordinary skill in the pertinent arts will recognize that any type or form of machine learning system (e.g., hardware and/or software components or modules) may be utilized in accordance with the present disclosure. For example, one or more machine learning algorithms or techniques, including but not limited to nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses may be utilized alone or in combination to develop user models, predict short-term user behavior, and/or predict long-term user behavior.

In some implementations, a machine learning system may identify not only a predicted engagement but also a confidence interval, confidence level or other measure or metric of a probability or likelihood that the predicted engagement will be exhibited by a user associated with a user profile similar to the user model in response to a particular advertisement under particular conditions. Where the machine learning system is trained using a sufficiently large corpus of user profiles, conditions, etc., recommended advertisements, actual user engagement behavior, etc., the confidence interval associated with the predicted engagement may be substantially high.

In accordance with the present disclosure, a trained machine learning system may be used to develop user models of similar user profiles under similar conditions based on the user profile characteristics and how users associated with those user profiles behaved under those conditions in response to various advertisements of an advertisement campaign. Based on such user models, advertisements for an advertisement campaign and/or advertisement placement positions within an application may be selected that will produce the highest probability of user engagement in response to the advertisement. The ad server system may then dynamically generate the advertisement and/or select appropriate ad placement positions within applications based on the trained models.

Figure 8:
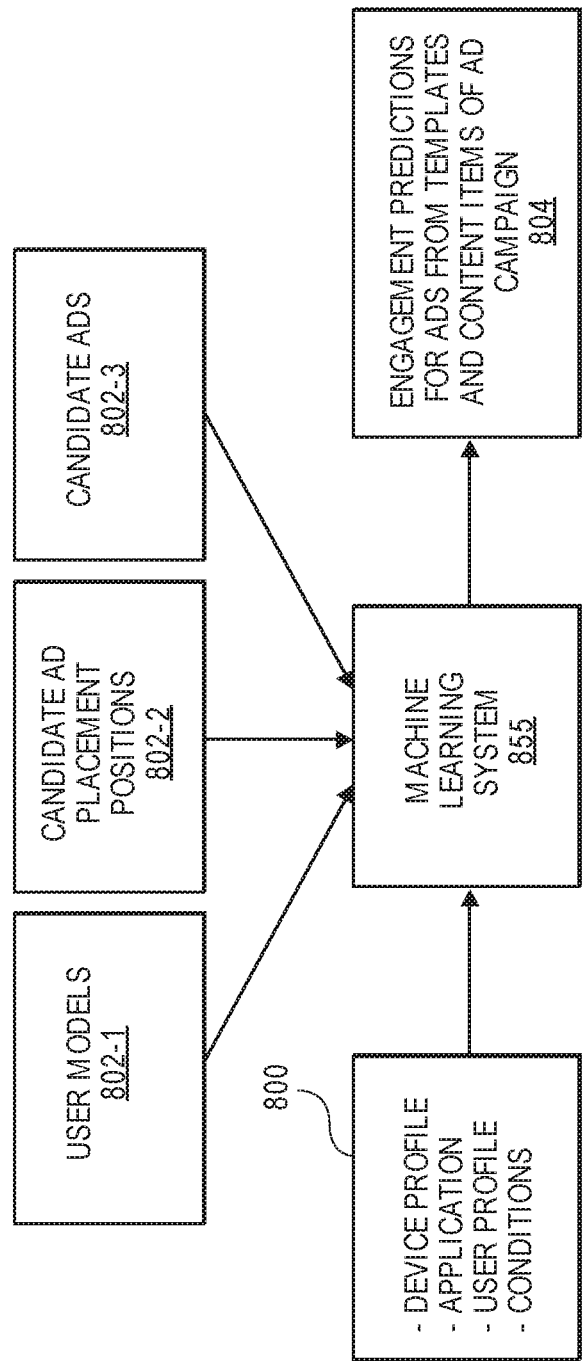
FIG. 8 is a block diagram of an example trained machine learning system that receives engagement predictions for advertisements generated with different advertisement templates and content items of an ad campaign, in accordance with described implementations.

Referring to FIG. 8, illustrated is the trained machine learning system 855 receiving inputs 800 of a user profile for user A, device profile, conditions at the location of the device, and application information indicating an application through which an advertisement is to be presented. The conditions may be provided by the device and include, for example, location of the device, orientation of the device, altitude, temperature, etc. Alternatively, or in addition thereto, conditions may be obtained from a third-party service. for example, the machine learning system 855 may receive location information for the device and then obtain condition information (e.g., weather) for that location from a third party. In addition to receiving inputs 800, the machine learning system may determine or receive candidate ad placement positions 802-2. For example, the application information may indicate the candidate ad placement position and optionally one or more templates that may be used to generate an advertisement for presentation at that ad placement position. Alternatively, the machine learning system may determine an ad placement position based on a plurality of candidate ad placement positions corresponding to the application.

The machine learning system may also receive or determine candidate ads 802-3 and developed user models 802-1. For example, the ad server system may indicate candidate ads that may be generated and sent to the user device for presentation to the user. The user model 802-1 may be determined based on a combination of one or more of the application, user profile, device profile, and/or conditions received as inputs 800. For example, a user profile that has a highest similarity to the inputs 800 may be determined.

Utilizing the user model, the machine leaning system determines, based on the user model and the inputs 800, predicted engagement values 804 for each candidate ad generated from various template/content item combinations, as discussed above. The predicated engagement values 804 indicated the likelihood the user will engage with the advertisement under the given conditions.

In some implementations, the selected user model may also be used to determine one or more candidate ad placement positions that may be utilized to present the ads to the user. For example, based on the inputs 800, the machine learning system 855 may determine from the user model an expected access duration and a quantity of ads that should be presented to the user during the access duration to optimize for user engagement without the ads being disruptive to the user. In such an example, the selection of ad placement positions may be determined in conjunction with determining predicted engagement values, as the different candidate ad placement positions may impact the predicted engagement value for the different candidate advertisements.

Figure 9:
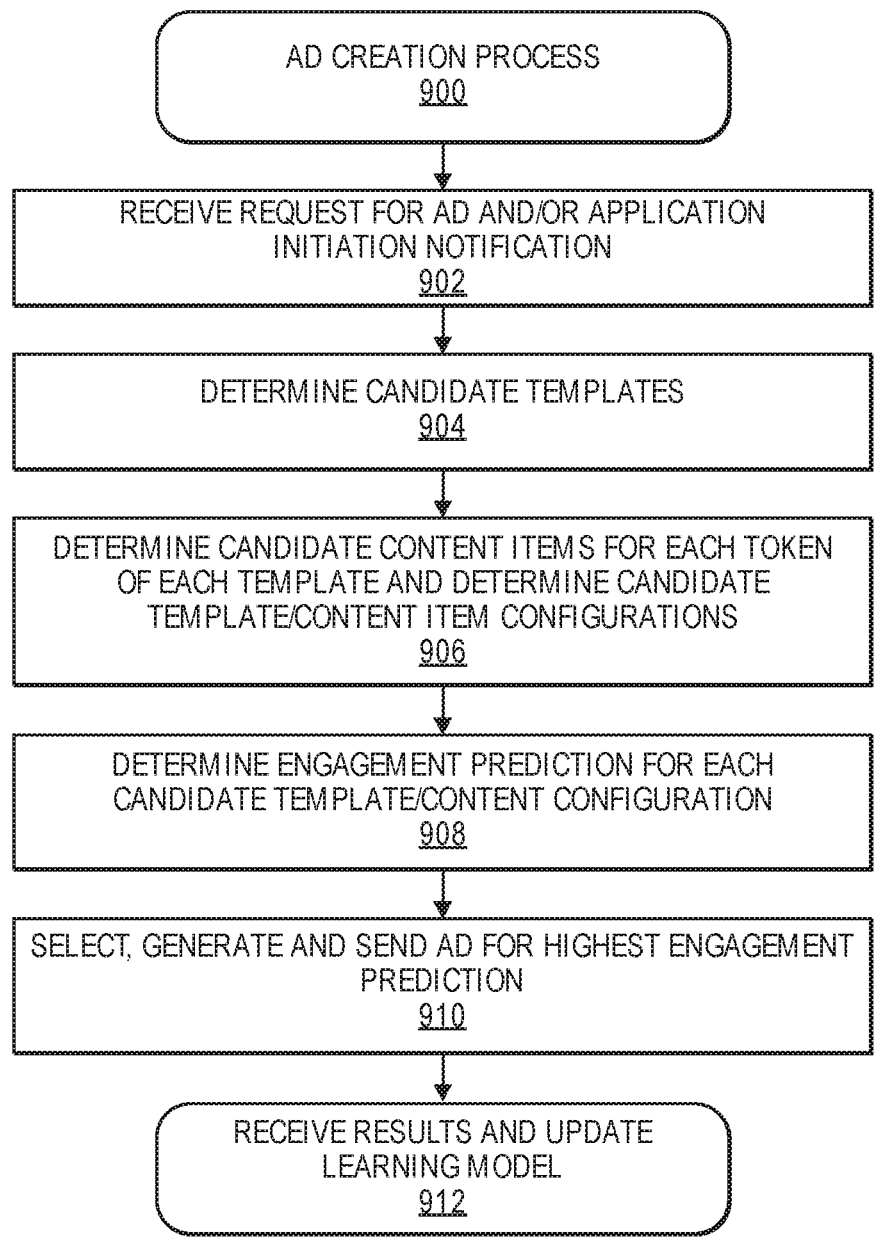
FIG. 9 is an example advertisement creation process, in accordance with described implementations.

FIG. 9 is an example advertisement creation process 900, in accordance with described implementations. The example process initiates upon receipt from a user device or an application executing on a user device, a request for an advertisement and/or of an application initiation notification, as in 902. For example, in some implementations, when an application is initiated for which advertisements are to be provided for presentation to a user, a notification of the application initiation may be sent to the example process 900. Alternatively, or in addition thereto, in anticipation of an ad placement position being reached for which an ad is to be presented, a request for an advertisement may be sent to the example process 900.

Upon receipt of the request and/or notification, one or more candidate ad templates that may be used to generate an advertisement to send in response to the request or notification are determined, as in 904. As discussed above, a variety of factors may be considered in determining ad templates that may be used to create an advertisement. For example, a machine learned user model may be selected that corresponds with one or more of a user profile of a user to which the advertisement is to be presented, a device profile to which the advertisement is to be sent, and/or other conditions existing or expected to exist at the time of ad presentation. Other factors may include the application, application type, and/or application content in which the advertisement is to be presented, and/or the advertisement campaign that is to be used. In other implementations, the candidate template may be selected independent of the advertising campaign and upon selection of candidate templates, advertising campaigns that include content items associates with each of the tokens of one or more of the candidate templates may be considered.

For each candidate template, candidate content items for each token of the template are determined and candidate template/content item configurations are determined, as in 906. Each candidate template/content item configuration represents a unique configuration of content items associated with the various tokens of the candidate template. As such, for each candidate template, utilizing the rule of products or multiplication principal, there will be "n" number of candidate template/content item configurations, where n is the product of the number of content items associated with each template of the candidate token. For example, if there are three tokens in a candidate template and there are two content items associated with each token, there will be eight candidate template/content item configurations (2*2*2).

As discussed above, candidate templates include one or more tokens and one or more content items of an ad campaign may be associated with each token. The content items may be from the same or different advertisement campaigns. However, each candidate template/content item configuration will be specific to each advertisement campaign (i.e., a candidate template/content item configuration will not include content items from different advertisement campaigns).

In some implementations, rather than selecting candidate templates and determining candidate content items for each token of each template, candidate content items may first be selected and then candidate templates that are linked to those content items (e.g., via tokens) may be determined. In such an example, the candidate content items are selected, then candidate templates are selected that may be used to present one or more of those content items, and then candidate template/content item configurations are determined that will produce advertisements that include the candidate content items presented according to one of the candidate templates.

For each candidate template/content item configuration, an engagement prediction is determined, as in 908. The engagement predication may be determined based on, for example, a machine learned user model that is selected based on one or more of the user profile, device profile, application, and/or environmental conditions. As discussed above, the user model may be developed based on actual user behavior under similar conditions and utilized with the current conditions and candidate template/content item configuration to predict a level of engagement if an advertisement created according to the candidate template/content item configuration is generated and presented to the user.

Based on the determined predictions, a candidate item template/content item configuration is selected that has the highest prediction and an advertisement is generated based on the template and content items corresponding to the selected candidate template/content item configuration, as in 910. In addition, the generated advertisement is sent to the mobile device as a response to the ad request or notification of the application initiation.

At some time after sending the advertisement, the example process may receive results indicating actual engagement by the user with the presented advertisement, as in 912. The results may then be used to update the user model by providing those results to the machine learning system as further input into the machine learning system for development of user models. By providing actual feedback into the machine learning system, the user models may be continuously or periodically updated with additional actual information, thereby improving future predictions relating to different candidate template/content item configurations.

Figure 10:
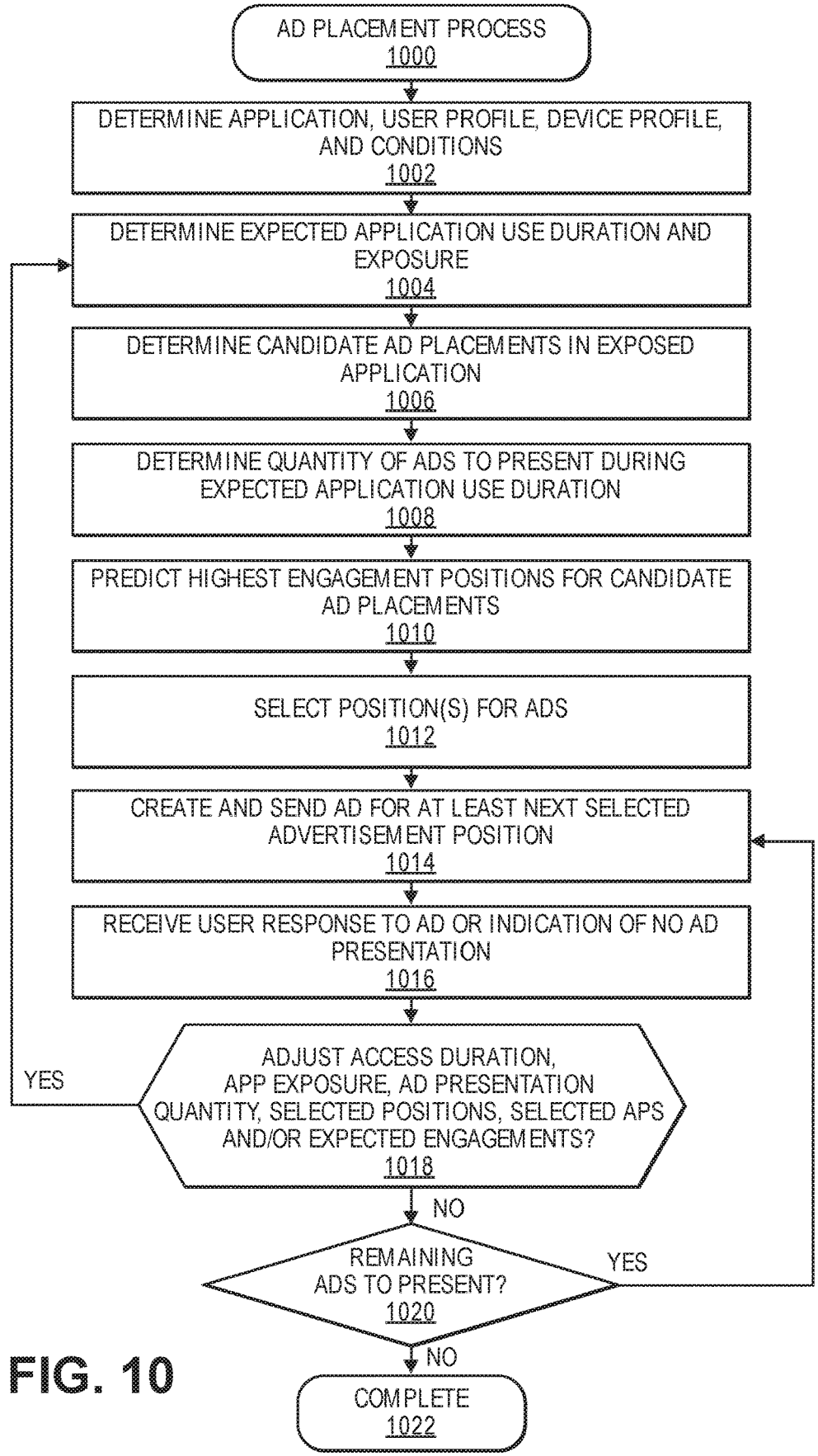
FIG. 10 is an example advertisement placement process, in accordance with described implementations.

FIG. 10 is an example advertisement placement process 1000, in accordance with described implementations. In some implementations, rather than filling all advertisement placement positions within an application, a producer may identify multiple candidate advertisement placement positions and the example process 1000 may be utilized to selected specific ones of the candidate advertisement placement positions to optimize user engagement potential while reducing potential user disruption.

The example process 1000 begins by determining at least one of a user profile of a user of the application, a device profile, and/or conditions present or expected during ad presentation, as in 1002. As discussed above, the user device profile may be determined, for example, based on a user identifier provided by the user device and/or based on a user device identifier provided by the user device. Likewise, the user device profile may be determined, for example, based on a user device identifier provided by the user device. Conditions may be determined based on other information provided by the user device and/or received from one or more third party services (e.g., weather service, traffic service, etc.). For example, conditions may include time, position information, orientation information, movement information, network connectivity information (e.g., IP address, Wi-Fi address) etc., received from the user device and/or include third party provided weather information and/or traffic information corresponding to the position of the user device.

Based on the determined profiles and/or conditions, a machine learned user model (discussed above) is utilized to determine an expected application access duration and the amount of the application that will be exposed to the user during the access duration, as in 1004. For example, a user model may be selected based on the determined profiles and/or conditions and a predicted application access duration may be determined and/or exposure amount may be determined from the user model. In some implementations, the user model may be developed based on only the user that is accessing the application, based on, for example, actual historical user behavior. As one example, if a user consistently accesses a news application on their mobile device during their commute to work on Monday-Friday between 7:00-7:30, it may be determined from past user behavior both the access duration and the portions of the application the user will access (the application exposure).

Based on the expected access duration and exposure, candidate ad placement positions in the portion of the application that are expected to be exposed to the user during the access duration are determined, as in 1006. In some implementations, the publisher may provide an indication of all available ad placement positions within an application. Such information may be used to determine candidate ad placement positions.

In addition to determining candidate ad placement positions, a quantity of ads to present to the user through the application during the access duration are determined, as in 1008. Similar to determining an expected access duration and exposure, in some implementations, a quantity of ads to be presented may be based on a user model determined by a machine learning system from a group of users actual behavior and/or based on actual user behavior from the user. For example, a quantity of ads may be determined based on actual user behavioral response to the number of ads presented under similar conditions. As a different quantity of ads are presented, the user engagement may vary from a higher percentage of engagement to a user closing the application before the expected access duration (e.g., if too many ads are presented). As such, less than an all candidate ad placement positions available within the application that are expected to be exposed to the user during the access duration may be used. For example, if there are ten candidate ad placement positions, based on actual user behavior of the user (or similar users) it may be determined that presentation of no more than six advertisements will result in the highest engagement potential for the advertisements without being disruptive to the user. In such a case, it may be determined to only utilize six of the available ten available ad placement positions.

Based on the quantity of ads determined to be presented to the user during the expected access duration, highest engagement positions from the available candidate ad placement positions are also determined, as in 1010. Highest engagement positions may again be determined based on a user model determined from machine learning that utilizes actual user behavior of the user and/or other users under similar conditions. For example, based on actual user behavior of other users engagement with different advertisements, at the various candidate positions within the application under similar conditions, highest engagement potential ad placement positions may be determined for the user.

In some implementations, the ad placement positions may also factor in or otherwise consider the ads available for presentation to the user during the access duration. Such ads may be dynamically created or otherwise selected for presentation. For example, if it is determined that six advertisements are to be presented to the user during the access duration, any of the above described implementations may be utilized to dynamically generate six advertisements to present to the user. In such an example, the highest engagement positions within the application may also consider the ads to be presented.

In some implementations, the dynamic creation of advertisements and the determination of highest engagement positions of candidate ad placement positions may be determined together such that the optimal candidate ad placement positions based on the dynamically generated ads are determined and the dynamically generated ads may be determined based on the candidate ad placement positions within the application. In such an implementation, both factors (candidate ad placement positions and candidate template/content items for each candidate ad placement position) may be considered as inputs to the machine learning system and the output may provide a recommendation of both ad placement positions and candidate template/content items for use in those positions to produce the highest potential for user engagement.

Based on the predicted highest engagement positions, ad placement positions within the application that are expected to be exposed to the user during the access duration are selected, as in 1012. For example, the highest engagement positions may be selected as the candidate ad placement positions to be used for the determined quantity of ads to be presented.

In addition to selecting ad placement positions, at least the advertisement that is to be presented at the selected next ad placement position is created or selected and sent to the user device for presentation at that selected ad placement position. In some implementations, the advertisement may be determined and generated using any of the above described implementations. Alternatively, the advertisement for the next selected position may be determined by other means.

At some point after sending the advertisement to the user device for presentation in the next selected ad placement position, a user response to the presented advertisement or an indication that the user closed the application prior to the advertisement being presented may be received, as in 1016. As discussed above, the user response may be used to update one or more user models by providing the information back to the machine learning system discussed above.

A determination may also be made, based at least in part on the received response, as to whether an expected access duration, application exposure, the quantity of advertisements to be presented during the access duration, the selected ad placement positions, the selected advertisements and/or the expected engagements are to be modified, as in 1018. For example, if the actual user response does not correspond with what was predicted, it may be determined that one or more of the expected access duration, application exposure, the quantity of advertisements to be presented during the access duration, the selected ad placement positions, the selected advertisements and/or the expected engagements are to be modified because the user has not behaved in an expected manner.

If it is determined that one or more of the expected access duration, application exposure, the quantity of advertisements to be presented during the access duration, the selected ad placement positions, the selected advertisements and/or the expected engagements are to be modified, the example process returns to block 1004 and continues. As the example process continues, it utilizes the received user response as another input to determining the expected access duration, the expected application exposure, the quantity of advertisements to be presented during the access duration, the selected ad placement positions, the selected advertisements and/or the expected engagements for the example process 1000.

If it is determined that expected access duration, application exposure, the quantity of advertisements to be presented during the access duration, the selected ad placement positions, the selected advertisements and/or the expected engagements do not need to be modified, a determination is made as to whether additional advertisements remain to be presented to the user during the expected access duration, as in 1020. If it is determined that ads remain, the example process returns to block 1014 and continues for the next selected ad placement position. If it is determined that there are no additional ads to present, the example process completes, as in 1022.

Figure 11:
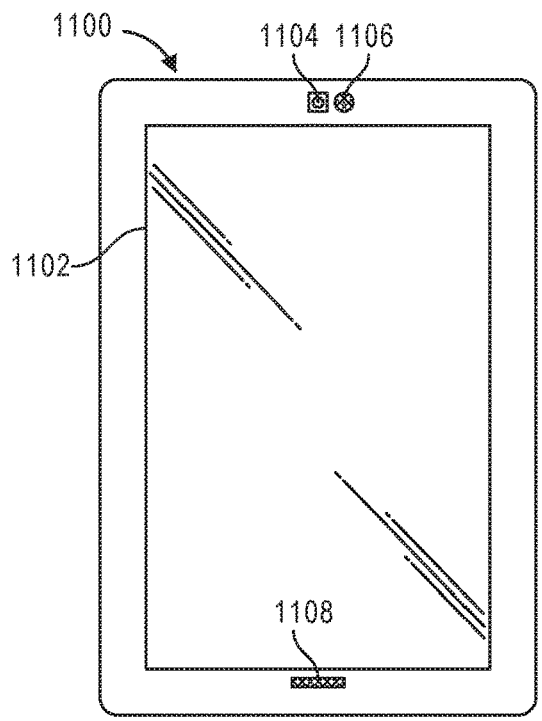
FIG. 11 illustrates an example computing device, according to an implementation.

FIG. 11 illustrates an example user device 1100 that can be used in accordance with various implementations described herein. In this example, the user device 1100 includes a display 1102 and optionally at least one input component 1104, such as a camera, on a same and/or opposite side of the device as the display 1102. The user device 1100 may also include an audio transducer, such as a speaker 1106, and optionally a microphone 1108. Generally, the user device 1100 may have any form of input/output components that allow a user to interact with the user device 1100. For example, the various input components for enabling user interaction with the device may include a touch-based display 1102 (e.g., resistive, capacitive), camera, microphone, global positioning system (GPS), compass, accelerometer, or any combination thereof. One or more of these input components may be included on a device or otherwise in communication with the device. Various other input components and combinations of input components can be used as well within the scope of the various implementations as should be apparent in light of the teachings and suggestions contained herein.

Figure 12:
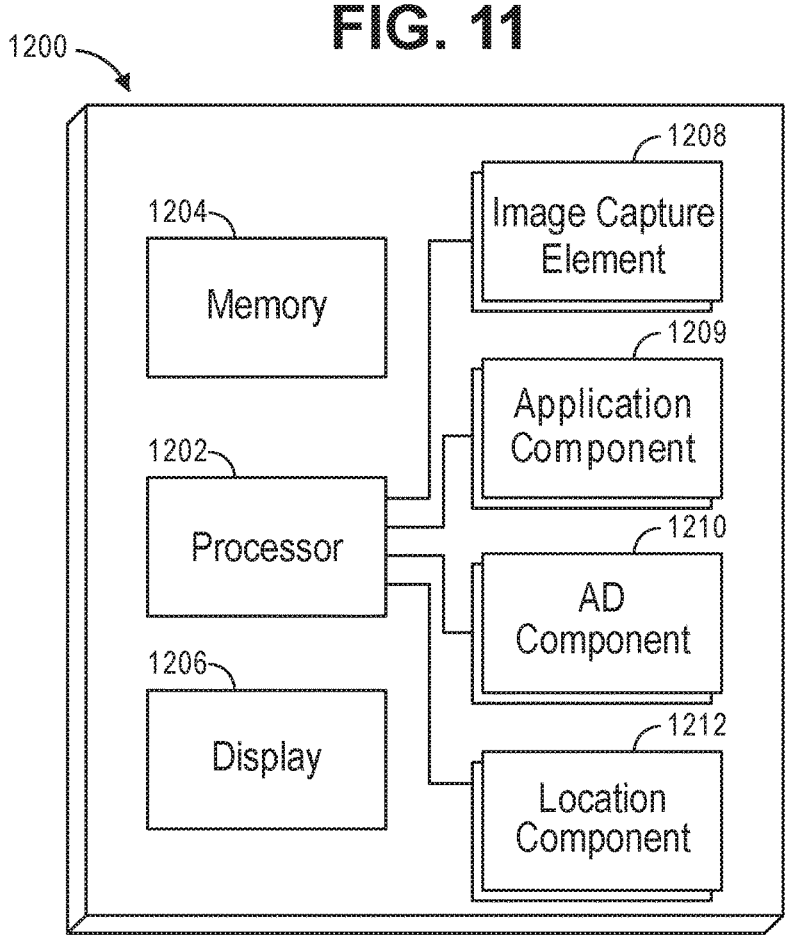
FIG. 12 illustrates an example configuration of components of a computing device, such as that illustrated in FIG. 11.

In order to provide the various functionality described herein, FIG. 12 illustrates an example set of basic components 1200 of a user device 1100, such as the user device 1100 described with respect to FIG. 11 and discussed herein. In this example, the device includes at least one central processor 1202 for executing instructions that can be stored in at least one memory device or element 1204. As would be apparent to one of ordinary skill in the art, the device can include many types of memory, data storage or computer-readable storage media, such as a first data storage for program instruction for execution by the processor 1202. Removable storage memory can be available for sharing information with other devices, etc. The device typically will include some type of display 1206, such as a touch-based display, electronic ink (e-ink), organic light emitting diode (OLED), or liquid crystal display (LCD).

The device in many implementations will include at least one image capture element 1208, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one ad component 1210 for performing the process of sending ad requests and/or application initiation notifications, providing user and/or device information, etc. For example, the user device may be in constant or intermittent communication with a remote computing resource and may exchange information, such as selected advertisements, user device information, user information, application information, engagement information, conditions, etc. The device 1200 may also include an application component 1209 that enables execution and/or monitoring of applications executing on the device. In some implementations, the application component 1209 may collect usage information about applications and provide that information to the ad server system, the machine learning system, advertisers, attributers, etc.

The device also can include at least one location component 1212, such as GPS, NFC location tracking or Wi-Fi location monitoring. Location information obtained by the location component 1212 may be used with the various implementations discussed herein as a factor in generating advertisements, determining appropriate user models to use with the described implementations, etc.

The example user device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations.

Figure 13:
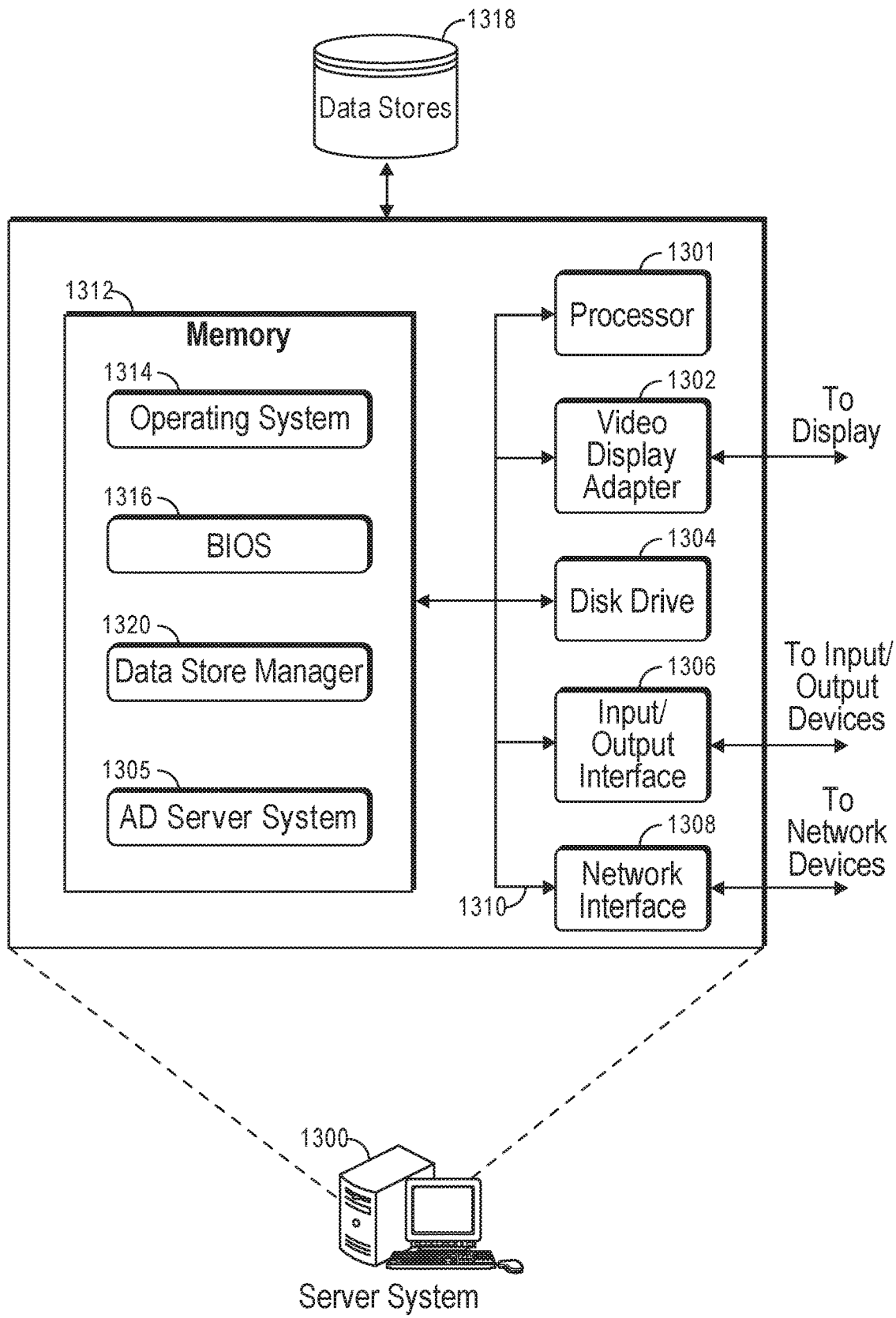
FIG. 13 is a pictorial diagram of an illustrative implementation of a server system that may be used for various implementations.

FIG. 13 is a pictorial diagram of an illustrative implementation of a server system 1300, such as a remote computing resource, that may be used with one or more of the implementations described herein. The server system 1300 may include a processor 1301, such as one or more redundant processors, a video display adapter 1302, a disk drive 1304, an input/output interface 1306, a network interface 1308, and a memory 1312. The processor 1301, the video display adapter 1302, the disk drive 1304, the input/output interface 1306, the network interface 1308, and the memory 1312 may be communicatively coupled to each other by a communication bus 1310.

The video display adapter 1302 provides display signals to a local display permitting an operator of the server system 1300 to monitor and configure operation of the server system 1300. The input/output interface 1306 likewise communicates with external input/output devices, such as a mouse, keyboard, scanner, or other input and output devices that can be operated by an operator of the server system 1300. The network interface 1308 includes hardware, software, or any combination thereof, to communicate with other computing devices. For example, the network interface 1308 may be configured to provide communications between the server system 1300 and other computing devices, such as the user device 1100.

The memory 1312 generally comprises random access memory (RAM), read-only memory (ROM), flash memory, and/or other volatile or permanent memory. The memory 1312 is shown storing an operating system 1314 for controlling the operation of the server system 1300. A binary input/output system (BIOS) 1316 for controlling the low-level operation of the server system 1300 is also stored in the memory 1312.

The memory 1312 additionally stores program code and data for providing network services that allow user devices 1100 and external sources to exchange information and data files with the server system 1300. The memory also stores a data store manager application 1320 to facilitate data exchange and mapping between the data store 1318, ad server system 1305, user devices, such as the user device 1100, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1300 can include any appropriate hardware and software for integrating with the data store 1318 as needed to execute aspects of one or more applications for the user device 1100, the external sources and/or the ad server system 1305. The server system 1300 provides access control services in cooperation with the data store 1318 and is able to generate content such as advertisements.

The data store 1318 can include several separate data tables, databases or other data storage mechanisms and media for storing data relating to a particular aspect. For example, the data store 1318 illustrated includes content items for advertisement campaigns and corresponding metadata (e.g., tokens, indexes) about those items. Templates, user profiles, machine learned user models, and other information may likewise be stored in the data store.

It should be understood that there can be many other aspects that may be stored in the data store 1318, which can be stored in any of the above listed mechanisms as appropriate or in additional mechanisms of any of the data stores. The data store 1318 may be operable, through logic associated therewith, to receive instructions from the server system 1300 and obtain, update or otherwise process data in response thereto.

The memory 1312 may also include the ad server system 1305. The ad server system 1305 may be executable by the processor 1301 to implement one or more of the functions of the server system 1300. In one implementation, the ad server system 1305 may represent instructions embodied in one or more software programs stored in the memory 1312. In another implementation, the ad server system 1305 can represent hardware, software instructions, or a combination thereof. The ad server system 1305 may perform some or all of the implementations discussed herein, alone or in combination with other devices, such as the user device 1100.

The server system 1300, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction in FIG. 13 should be taken as being illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the art should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
one or more processors; and
memory storing program instructions that when executed by the one or more processors cause the one or more processors to at least:
receive from an advertiser:
a plurality of content items of an advertisement campaign; and
an association of each content item with one or more tokens of a sample advertisement template;
store, in a data store, the plurality of content items and the association of each content item with one or more tokens;
receive, from an application executing on a user device, an advertisement request, the advertisement request indicating an application identifier of the application and at least one of a user device identifier or a user identifier;
receive, from the user device:
an identifier corresponding to a user profile; and
an environmental information indicating at least one of a geographical data, a location data, a motion data, a language, a time, an application setting, a demographic data for a user of the user device, an access duration data, or a cache information;
determine, based at least in part on the user profile and the environmental information, a user model generated by a trained machine learning system, the user model indicative of the user profile and the environmental information;
determine, based at least in part on the application identifier, a plurality of candidate advertisement templates, wherein:
each of the candidate advertisement templates are different than the sample advertisement template,
each candidate advertisement template includes at least one token of the one or more tokens at a respective position within the candidate advertisement template, and
a same token is included in at least two of the plurality of candidate advertisement templates;
obtain, from the data store, for each token associated with each of the plurality of candidate advertisement templates, at least one candidate content item provided by the advertiser and associated with the token;
determine, for each of the plurality of candidate templates, a plurality of candidate advertisements, each candidate advertisement corresponding to the respective candidate template and including different combinations of content items at each location within the candidate template associated with each token;
determine, with the trained machine learning system, for each candidate advertisement and based at least in part on the user model, an engagement predication value indicating a likelihood that the user of the user device will engage with the advertisement;
generate an advertisement from the plurality of candidate advertisements having a highest engagement prediction value;
send the advertisement to the user device for presentation by the application to the user,
subsequent to sending the advertisement, receive a result indicating an actual engagement with the advertisement; and
provide the result to the trained machine learning system as a feedback to improve future engagement predictions generated by the trained machine learning system.

2. The computing system of claim 1, wherein the program instructions further cause the one or more processors to at least:
receive from a publisher of the application, an indication of a plurality of templates for use in creating advertisements to be sent to the application for presentation; and
wherein the plurality of candidate templates are determined based at least in part on the indication of the plurality of templates.

3. The computing system of claim 1, wherein the program instructions further cause the one or more processors to at least:
receive from a publisher:
an indication of a first placement within the application at which a first advertisement is to be presented;
an indication of a first plurality of templates for use in creating the first advertisement;
an indication of a second placement within the application at which a second advertisement is to be presented; and
an indication of a second plurality of templates for use in creating the second advertisement.

4. The computing system of claim 3, wherein:
the request further indicates the first placement or the second placement; and
the plurality of candidate templates are based at least in part on the first placement or the second placement indicated in the request.

5. A computer-implemented method, comprising:
receiving from an advertiser:
a plurality of content items of an advertisement campaign; and
an association of each content item of the plurality of content items with one or more tokens of a sample template;
receiving, from a user device, a request for an advertisement to be presented in an application executing on the user device;
receiving, from the user device:
an identifier corresponding to a user profile; and
an environmental information indicating at least one of a geographical data, a location data, a motion data, a language, a time, an application setting, a demographic data for a user of the user device, an access duration data, or a cache information;
determining, based at least in part on the user profile and the environmental information, a user model generated by a trained machine learning system, the user model indicative of the user profile and the environmental information;
determining a first candidate template and a second candidate template for use in generating the advertisement to send to the user device in response to the request, wherein:
the first candidate template is different than the sample template; and
the second candidate template is different than the sample template;
determining a first token of the one or more tokens associated with a first location within the first candidate template and associated with a second location within the second candidate template;

determining a first content item of the plurality of content items associated with the first token;

determining, with the trained machine learning system and based at least in part on the user model, a first engagement probability value for a first advertisement created with the first candidate template that includes the first content item at the first location;

determining, with the trained machine learning system and based at least in part on the user model, a second engagement probability value for a second advertisement created with the second candidate template that includes the first content item at the second location;

determining that the first engagement probability value is higher than the second engagement probability value;

in response to determining that the first engagement probability value is higher than the second engagement probability value:

generating the first advertisement using the first template and the first content item; and sending to the user device the first advertisement in response to the request;

subsequent to sending the advertisement, receiving a result indicating an actual engagement with the advertisement; and providing the result to the trained machine learning system as a feedback to improve future engagement predictions generated by the trained machine learning system.

6. The computer-implemented method of claim 5, further comprising:

determining a second content item of the plurality of content items associated with the first token;

determining, with the trained machine learning system and based at least in part on the user model, a third engagement probability value for a third advertisement created with the first candidate template that includes the second content item at the first location;

determining, with the trained machine learning system and based at least in part on the user model, a fourth engagement probability value for a fourth advertisement created with the second candidate template that includes the second content item at the second location; and determining that the first engagement probability value is higher than the second engagement probability value, the third engagement probability value, and the fourth engagement probability value.

7. The computer-implemented method of claim 5, wherein determining the first engagement probability value includes:

determining the user profile associated with the user device; and selecting the user model based at least in part on the user profile.

8. The computer-implemented method of claim 5, further comprising:

determining a first content item type of the first content item; and wherein the first engagement probability value is further based at least in part on the first content item type.

9. The computer-implemented method of claim 5, wherein the identifier indicates at least one of an application identifier for the application, a user device identifier, or a user profile identifier.

10. The computer-implemented method of claim 5, wherein determining the user model is further based at least in part on one or more of the first candidate template, an application identifier, the device identifier, the user profile identifier, or a type of the first content item.

11. The computer-implemented method of claim 5, wherein the user model is developed based on actual engagements by users with presented advertisements.

12. A non-transitory computer-readable storage medium storing instructions that, when executed by at least one processor of a computing system, cause the computing system to at least:

receive from an advertiser:

a first content item, a second content item, and a third content item, each of the first content item, the second content item, and the third content item for use in dynamically creating advertisements;

an association of the first content item and the second content item with a first token included in a sample template; and an association of the third content item with a second token included in the sample template;

receive from a user device a request for an advertisement to be presented in an application executing on the user device;

receive from the user device:

an identifier corresponding to a user profile; and an environmental information indicating at least one of a geographical data, a location data, a motion data, a language, a time, an application setting, a demographic data for a user of a user device, an access duration data, or a cache information;

determining, based at least in part on the user profile and the environmental information, a user model generated by a trained machine learning system, the user model indicative of the user profile and the environmental information;

determine a first candidate template for use in dynamically generating an advertisement to send to the user device in response to the request, wherein the first template is different than the sample template and includes the first token at a first location and the second token at a second location;

determine, with the trained machine learning system and based at least in part on the user model, a first engagement probability value for a first advertisement created with the first candidate template that includes the first content item at the first location and the third content item at the second location;

determine, with the trained machine learning system and based at least in part on the user model, a second engagement probability value for a second advertisement created with the first candidate template that includes the second content item at the first location and the third content item at the second location;

determine that the first engagement probability value is higher than the second engagement probability value;

in response to a determination that the first engagement probability value is higher than the second engagement probability value:

generate the first advertisement using the first candidate template, the first content item at the first location, and the third content item at the third location; and send to the user device the first advertisement in response to the request;

subsequent to sending the advertisement, receive a result indicating an actual engagement with the advertisement; and provide the result to the trained machine learning system as a feedback to improve future engagement predictions generated by the trained machine learning system.

13. The non-transitory computer-readable storage medium of claim 12, wherein the instructions further cause the computing system to at least:
  determine a second candidate template that includes the first token at a third location, wherein the second candidate template is different than the sample template;
  determine, with the trained machine learning system and based at least in part on the user model, a third engagement probability value for a third advertisement created with the second candidate template that includes the first item at the third location;
  determine, with the trained machine learning system and based at least in part on the user model, a fourth engagement probability value for a fourth advertisement created with the second candidate template that includes the second item at the third location; and
  determine that the first engagement probability value is higher than the third engagement probability value and the fourth engagement probability value.

14. The non-transitory computer-readable storage medium of claim 12, wherein the instructions further cause the computing system to at least:
  maintain, in a data store, a plurality of user models, wherein the user model is included in the plurality of user models.

15. The non-transitory computer-readable storage medium of claim 14, wherein each of the plurality of user models are developed by the trained machine learning system based at least in part on actual user engagements with presented advertisements.

\* \* \* \* \*